(12) United States Patent
Du et al.

(10) Patent No.: US 12,452,704 B2
(45) Date of Patent: Oct. 21, 2025

(54) MULTICAST TRANSMISSION CONTROL METHOD AND APPARATUS, COMPUTER DEVICE AND STORAGE MEDIUM

(71) Applicant: GUANGDONG OPPO MOBILE TELECOMMUNICATIONS CORP., LTD., Dongguan (CN)

(72) Inventors: Yongyang Du, Dongguan (CN); Ronghui Hou, Dongguan (CN); Lei Huang, Singapore (SG); Chaoming Luo, Dongguan (CN); Jun Zhang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 367 days.

(21) Appl. No.: 18/144,011

(22) Filed: May 5, 2023

(65) Prior Publication Data
US 2023/0276265 A1 Aug. 31, 2023

Related U.S. Application Data

(63) Continuation of application No. PCT/CN2020/127294, filed on Nov. 6, 2020.

(51) Int. Cl.
*H04W 24/00* (2009.01)
*H04W 4/06* (2009.01)
*H04W 24/02* (2009.01)

(52) U.S. Cl.
CPC .......... *H04W 24/02* (2013.01); *H04W 4/06* (2013.01)

(58) Field of Classification Search
CPC ................. H04W 24/02; H04W 4/06
See application file for complete search history.

(56) References Cited

U.S. PATENT DOCUMENTS 8,411,608 B2 4/2013 Chandra et al.
9,148,259 B2 * 9/2015 Bejerano ............. H04L 47/15
(Continued)

FOREIGN PATENT DOCUMENTS

CN 101023609 A 8/2007
CN 104602299 A 5/2015

OTHER PUBLICATIONS

Extended European Search Report dated Nov. 30, 2023 received in European Patent Application No. EP20960436.2.
(Continued)

*Primary Examiner* — Erika A Washington
(74) *Attorney, Agent, or Firm* — Sheppard, Mullin, Richter & Hampton LLP

(57) ABSTRACT

The present disclosure relates to wireless communication technology, and provides a multicast transmission control method and apparatus, a computer device, and a storage medium. The method includes: obtaining station information lists of at least two APs, the station information list including channel quality information of an associated first-type station and an associated second-type station, the first-type station being a station in an OBSS and the second-type station being a station not in the OBSS; generating multicast optimization information for the at least two APs based on the station information lists of the at least two APs respectively, the multicast optimization information indicating multicast rates and multicast receiving stations of the corresponding APs; and transmitting the corresponding multicast optimization information to the at least two APs.

20 Claims, 10 Drawing Sheets

---

201 — Obtain station information lists of at least two wireless Access Points (APs), the station information list of a target AP including channel quality information of a first-type station associated with the target AP and channel quality information of a second-type station associated with the target AP, the first-type station being a station in an Overlapping Basic Service Set (OBSS) and the second-type station being a station not in the OBSS 202 — Generate multicast optimization information for the at least two APs based on the station information lists of the at least two APs respectively, the multicast optimization information for the at least two APs indicating multicast rates of the at least two APs and multicast receiving stations of the at least two APs

(56) References Cited

U.S. PATENT DOCUMENTS

| | | |
|---|---|---|
| 2008/0186896 A1 | 8/2008 | Fanfelle et al. |
| 2015/0124681 A1 | 5/2015 | Zhou et al. |
| 2016/0315782 A1 | 10/2016 | Li et al. |
| 2017/0163315 A1 | 6/2017 | Wu et al. |
| 2018/0115982 A1 | 4/2018 | Reddy et al. |

OTHER PUBLICATIONS

International Search Report and Written Opinion dated Jun. 10, 2021 in International Application No. PCT/CN2020/127294. English translation attached.

Nakjung Choi et al. "Leader-Based Multicast Service in IEEE 802.11v Networks", IEEE Commun., 2010, 5 pages.

J. Villalon et al. "ARSM a cross-layer auto rate selection multicast mechanism for multi-rate wireless LANs", IEEE Commun., vol. 1, No. 5, Oct. 2007, pp. 893-902.

"Part 11: Wireless LAN Medium Access Control (MAC) and Physical Layer (PHY) Specifications" IEEE Std 802.11-2016, p. 916 section 9.4.2.37, p. 715 section 9.3.3.14, p. 9.4.1.33, Dec. 7, 2016.

"Part 11: Wireless LAN Medium Access Control (MAC) and Physical Layer (PHY) Specifications Amendment 1 Enhancement for High Efficiency WLAN" IEEE 802.11ax D6.0, p. 304 section 11.22.2.7, p. 378 section 26.7, Nov. 2019.

José Villalón et al."ARSM Auto Rate Selection Multicast Mechanism for Multi-rate Wireless LANs" p. 3 and 4, 2006.

\* cited by examiner

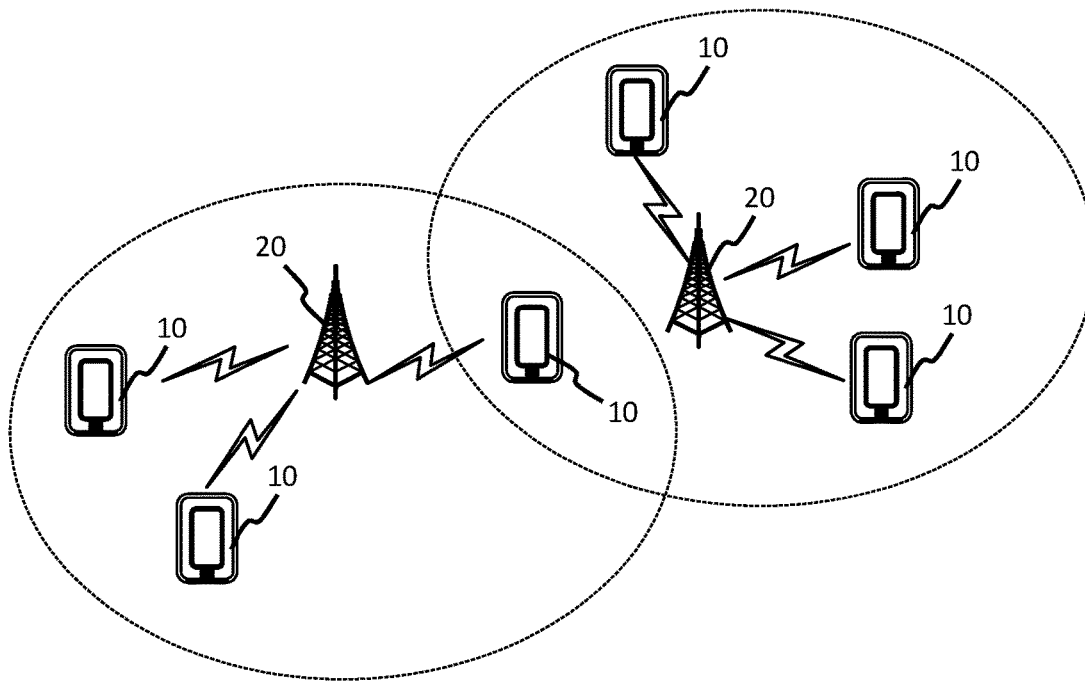

FIG. 1

Obtain station information lists of at least two wireless Access Points (APs), the station information list of a target AP including channel quality information of a first-type station associated with the target AP and channel quality information of a second-type station associated with the target AP, the first-type station being a station in an Overlapping Basic Service Set (OBSS) and the second-type station being a station not in the OBSS — 201

Generate multicast optimization information for the at least two APs based on the station information lists of the at least two APs respectively, the multicast optimization information for the at least two APs indicating multicast rates of the at least two APs and multicast receiving stations of the at least two APs — 202

FIG. 2

Obtain a station information list of the second AP, a station information list of a target AP including channel quality information of a first-type station associated with the target AP and channel quality information of a second-type station associated with the target AP, the first-type station being a station in an Overlapping Basic Service Set (OBSS) and the second-type station being a station not in the OBSS — 301

Transmit the station information list of the second AP to a multicast optimization device, such that the multicast optimization device generates multicast optimization information for the at least two APs based on the station information lists of the at least two APs respectively, the multicast optimization information for the at least two APs indicating multicast rates of the at least two APs and multicast receiving stations of the at least two APs — 302

FIG. 3

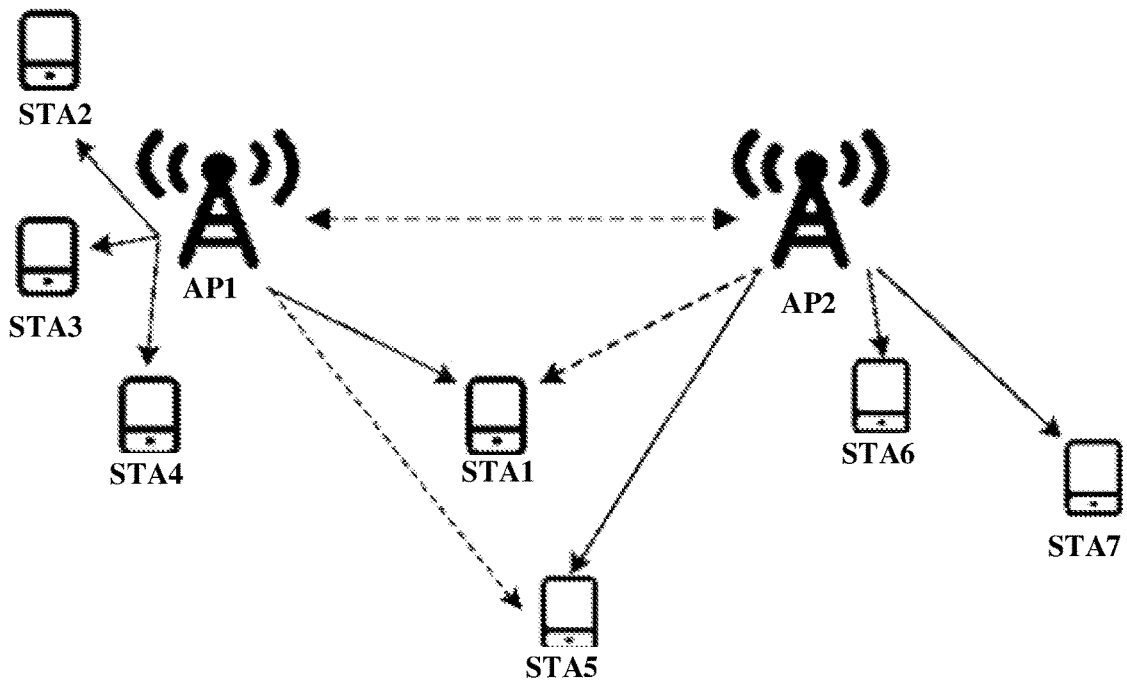
FIG. 6
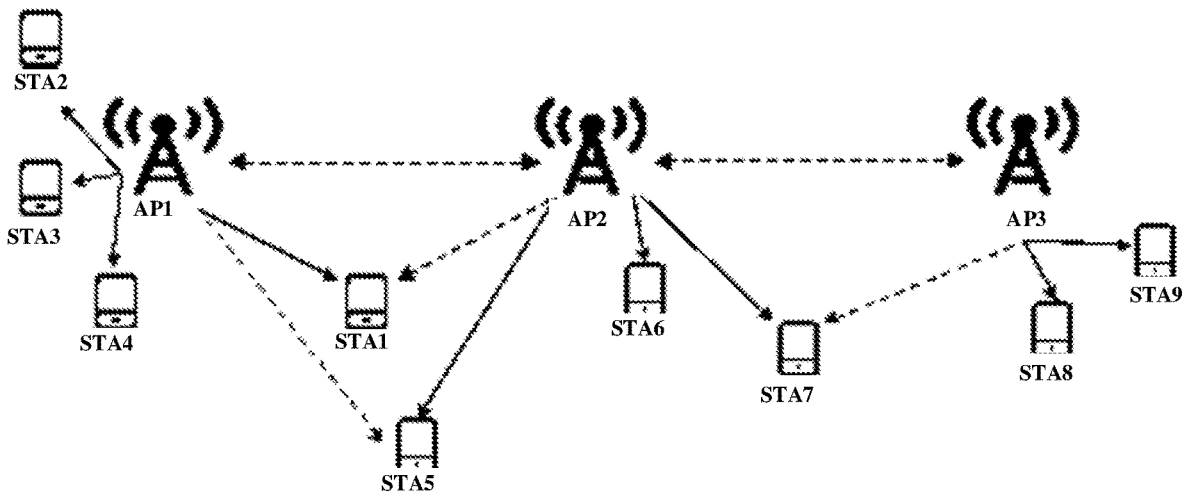
FIG. 7
| Element ID | Length | Neighbor AP Number |
FIG. 8
| Element ID | Length | Master AP BSSID |
FIG. 9

| 2 | 2 | 6 | 6 | 6 | 2 | 1 | 1 | Variable | 4 |
|---|---|---|---|---|---|---|---|---|---|
| Frame Control | Duration | Destination Address | Source Address | BSSID | Sequence Control | Type | Action | Information | Frame Check Sequence |
FIG. 14
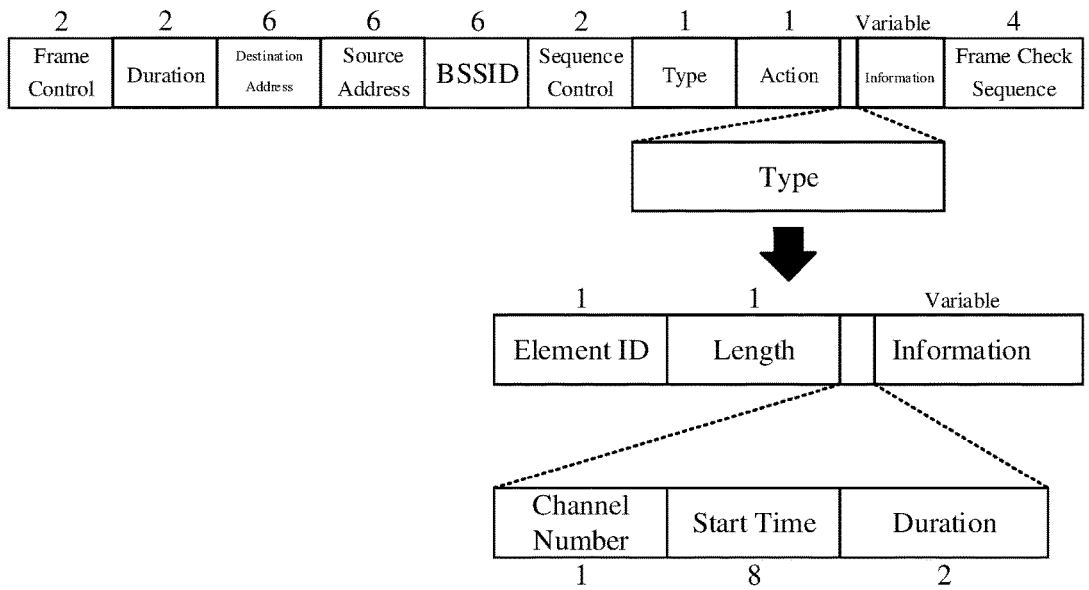
FIG. 15
| 2 | 2 | 6 | 6 | 6 | 2 | 1 | 1 | Variable | 1 | 6 | 4 |
|---|---|---|---|---|---|---|---|---|---|---|---|
| Frame Control | Duration | Destination Address | Source Address | BSSID | Sequence Control | Type | Action | CQI Report | STA's SNR For Neighbor AP | Neighbor AP's MAC Address | Frame Check Sequence |
FIG. 16
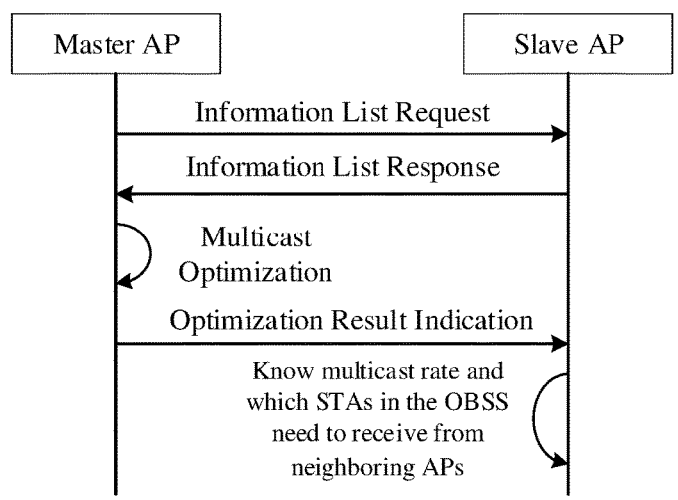
FIG. 17

MULTICAST TRANSMISSION CONTROL METHOD AND APPARATUS, COMPUTER DEVICE AND STORAGE MEDIUM

CROSS-REFERENCE TO RELATED APPLICATIONS

This application is a continuation of International Application No. PCT/CN2020/127294 filed on Nov. 6, 2020, which is incorporated herein by reference in its entirety.

TECHNICAL FIELD

The present disclosure relates to wireless communication technology, and more particularly, to a multicast transmission control method and apparatus, a computer device, and a storage medium.

BACKGROUND

With the continuous popularization of mobile terminals and the continuous development of mobile application scenarios, the demand for multicast communication in Wireless Local Area Network (WLAN) is also increasing.

In the related art, there is no feedback mechanism such as Acknowledge (ACK) in WLAN multicast, such that an Access Point (AP) cannot easily collect state information of stations (STAs) participating in the multicast. In order to ensure the reliability of the multicast, multicast frames in the WLAN are set to be transmitted at a low fixed bit rate, such as 1 Mbps.

SUMMARY

Embodiments of the present disclosure provide a multicast transmission control method and apparatus, a computer device, and a storage medium. The technical solutions are as follows.

In an aspect, the embodiment of the present disclosure provides a multicast transmission control method. The method includes: obtaining station information lists of at least two wireless Access Points (APs), the station information list of a target AP including channel quality information of a first-type station associated with the target AP and channel quality information of a second-type station associated with the target AP, the first-type station being a station in an Overlapping Basic Service Set (OBSS) and the second-type station being a station not in the OBSS, the target AP being any one of the at least two APs; and generating multicast optimization information for the at least two APs based on the station information lists of the at least two APs respectively, the multicast optimization information for the at least two APs indicating multicast rates of the at least two APs and multicast receiving stations of the at least two APs.

In yet another aspect, an embodiment of the present disclosure provides a computer device. The computer device includes a processor, a memory, and a transceiver. The transceiver is configured to obtain station information lists of at least two wireless Access Points (APs), the station information list of a target AP including channel quality information of a first-type station associated with the target AP and channel quality information of a second-type station associated with the target AP, the first-type station being a station in an Overlapping Basic Service Set (OBSS) and the second-type station being a station not in the OBSS, the target AP being any one of the at least two APs. The processor is configured to generate multicast optimization information for the at least two APs based on the station information lists of the at least two APs respectively, the multicast optimization information for the at least two APs indicating multicast rates of the at least two APs and multicast receiving stations of the at least two APs.

In yet another aspect, an embodiment of the present disclosure provides a computer device. The computer device is implemented as a second wireless Access Point (AP) of at least two APs. The computer device includes a processor, a memory, and a transceiver. The transceiver is configured to obtain a station information list of the second AP, a station information list of a target AP including channel quality information of a first-type station associated with the target AP and channel quality information of a second-type station associated with the target AP, the first-type station being a station in an Overlapping Basic Service Set (OBSS) and the second-type station being a station not in the OBSS, the target AP being any one of the at least two APs. The transceiver is further configured to transmit the station information list of the second AP to a multicast optimization device, such that the multicast optimization device generates multicast optimization information for the at least two APs based on the station information lists of the at least two APs respectively, the multicast optimization information for the at least two APs indicating multicast rates of the at least two APs and multicast receiving stations of the at least two APs.

BRIEF DESCRIPTION OF DRAWINGS

In order to describe the technical solutions in the embodiments of the present disclosure more clearly, the drawings to be used in the description of the embodiments will be briefly introduced below. Obviously, the drawings in the following description are only some embodiments of the present disclosure, and other drawings can be obtained by those of ordinary skill in the art based on these drawings without any inventive efforts.

FIG. 1 is a schematic diagram showing a network architecture of a communication system according to an embodiment of the present disclosure;

FIG. 2 is a flowchart illustrating a multicast transmission control method according to an embodiment of the present disclosure;

FIG. 3 is a flowchart illustrating a multicast transmission control method according to an embodiment of the present disclosure;

FIG. 6 and FIG. 7 are schematic diagrams showing two optimization group deployments in the embodiment shown in FIG. 5;

FIG. 8 is a schematic diagram showing an element for carrying number information in the embodiment shown in FIG. 5;

FIG. 9 is a schematic diagram showing a master AP information element in the embodiment shown in FIG. 5;

FIG. 14 shows a frame format of an action frame in the embodiment shown in FIG. 5;

FIG. 15 shows a frame format of a "measurement indication for adjacent APs" frame in the embodiment shown in FIG. 5;

FIG. 16 is a schematic diagram showing a CQI reply frame format in the embodiment shown in FIG. 5;

FIG. 17 is a schematic diagram showing multicast rate and station optimization in the embodiment shown in FIG. 5;

DESCRIPTION OF EMBODIMENTS

Figure 4:
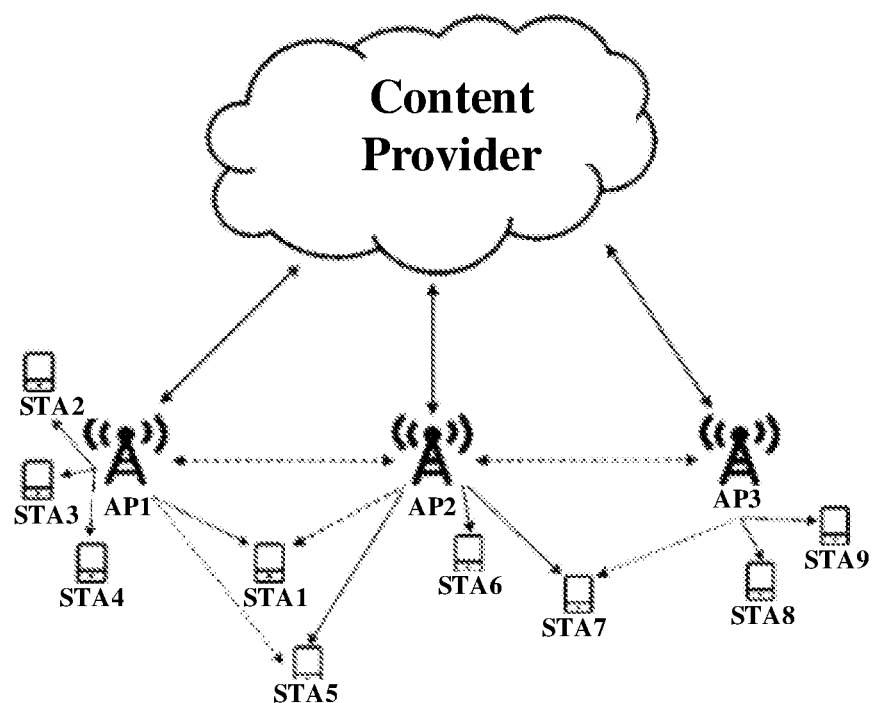
FIG. 4 is a schematic diagram showing multicast optimization according to an exemplary embodiment of the present disclosure.

The embodiments of the present disclosure will be further described in detail below with reference to the accompanying drawings, such that the objects, technical solutions, and advantages of the present disclosure will become more apparent.

The network architecture and service scenario described in the embodiments of the present disclosure are provided for illustrating the technical solutions of the embodiments of the present disclosure more clearly, and do not constitute limitations on the technical solutions according to the embodiments of the present disclosure. With the evolution of the technology and the emergence of new service scenarios, the technical solutions provided in the embodiments of the present disclosure are also applicable to similar technical problems.

Referring to FIG. 1, which is a schematic diagram showing a network architecture of a communication system according to an embodiment of the present disclosure. The network architecture may include: stations 10 and access points 20.

Typically, there are a plurality of stations 10, and each access point 20 may be associated with one or more stations 10. The station 10 may include various devices with wireless communication functions, such as handheld devices, vehicle-mounted devices, wearable devices, computing devices or other processing devices connected to wireless modems, as well as various forms of User Equipments (UEs), Mobile Stations (MSs), terminal devices and the like. For convenience of description, in the embodiments of the present disclosure, these devices are collectively referred to as stations (STAs).

The access point 20 is a device deployed in an access network to provide a wireless communication function for the stations 10. The access point 20 may include various forms of wireless routers, wireless switches, wireless relay devices and the like.

Optionally, what is not shown in FIG. 1 is that the network architecture further includes other network devices, such as gateway devices and the like.

The association and communication between the station 10 and the access point 20 can be performed using a wireless local area network technology, for example, based on the IEEE 802.11 protocol.

With the widespread application of smartphones and the continuous growth of multimedia services, IEEE 802.11 WLAN traffic is increasing explosively, with video traffic growing rapidly. For the video transmission over user-intensive networks such as sports events, video conferences, and smart classrooms, if the video stream is unicast to users, it will consume a lot of network resources, while multicast transmission not only saves resources but also has higher transmission efficiency. Therefore, the IEEE 802.11 WLAN has an increasing demand for multicast communication.

However, based on the multicast scheme in the IEEE 802.11 WLAN, in order to ensure reliability, multicast frames can only be transmitted at a low fixed bit rate, typically the lowest rate in the basic rate set. Although this scheme may guarantee reliability to a certain extent, the throughput of multicast transmission is extremely limited. At the same time, since the basic data rate will consume more radio resources, this will also affect the available capacity for other unicast traffic.

Before introducing the solutions shown in the following embodiments of the present disclosure, some terms and concepts used in the present disclosure will be introduced first.

1) Basic Service Set (BSS)

A BSS is a basic component of an 802.11 Wireless Local Area Network (WLAN).

BSSs can be divided into two types, i.e., Independent BSS (IBSS) and BSS with infrastructure (also known as basic BSS). Here, the IBSS refers to an Ad-Hoc association established by stations directly communicating with each other. An IBSS may consist of several stations, one of which acts as a master station.

A basic BSS corresponds to an AP, which may be connected to a Distributed System (DS).

APs in the base BSS periodically broadcast beacon frames. The beacon's period defines a fixed schedule of Target Beacon Transmission Time (TBTT). The beacon frames carry regulatory information, capability information, and information used to manage the BSS.

The 802.11 management function is to detect the presence of an AP either by scanning (i.e., passively searching for beacon transmissions) or actively using probe request/probe response exchanges. The scanning here is a process for a station to discover a BSS and be associated with the BSS. There are two forms of scanning: passive scanning and active scanning. A station's membership in the BSS is dynamic. The station may be powered on or off, or the station may be mobile and may move in or out of the area covered by the BSS. The station becomes a member of the BSS by being "associated" with the BSS. The station then becomes "disassociated" when leaving the BSS. In an Extent Service Set (ESS) composed of one or more basic BSSs, a station can migrate from one BSS to another by means of "re-association".

Here, the above association means that: the station is first associated with the AP, and then is allowed to transmit data through the AP. That is, a mapping relationship is established between the station and the AP, such that messages in the distributed system can reach the AP associated with the station, and finally reach the station itself. A station can only be associated with one AP at any given time. Re-association is to provide support for the mobility of the station, such that the station can switch from being associated with one AP to being associated with another AP in one Extended Service Set (ESS). Disassociation can be initiated by a station or an AP to terminate an existing association. When a station leaves the network, it can actively perform a disassociation operation.

In a WLAN, each basic service set has a unique identifier called BSSID.

2) Overlapping Basic Service Set (OBSS)

For multiple BSSs, a part with a short distance and an overlapping coverage is called Overlapping Basic Service Set (OBSS).

For example, it is assumed that there are two basic BSSs corresponding to AP1 and AP2, respectively. Here, AP1 is associated with Station 1, Station 2, and Station 3, and AP2 is associated with Station 4, Station 5, and Station 6. Among them, Station 3 and Station 4 are located in the basic BSS corresponding to AP1 and the basic BSS corresponding to AP2 (that is, Station 3 and Station 4 can receive signals transmitted by AP1 and AP2, respectively. Then, Station 3 and Station 4 are in the OBSS, and can also be referred to as OBSS stations.

Referring to FIG. 2, which is a flowchart illustrating a multicast transmission control method according to an embodiment of the present disclosure, the multicast transmission control method can be performed by a multicast optimization device. The multicast optimization device can be one of at least two APs (e.g., the access point 20 in the network architecture shown in FIG. 1), or the multicast optimization device may be a device other than the at least two APs, e.g., a gateway device. The method may include the following steps.

At step 201, station information lists of at least two wireless APs are obtained. The station information list of a target AP includes channel quality information of a first-type station associated with the target AP and channel quality information of a second-type station associated with the target AP. The first-type station is a station in an OBSS and the second-type station is a station not in the OBSS.

Here, the target AP is any one of the at least two APs.

In an embodiment of the present disclosure, the channel quality information indicates channel quality between the station and the AP. In a possible implementation, the numerical value of the channel quality information is positively correlated to the channel quality. For example, in an example where the channel quality information is a signal-to-noise ratio, the larger the value of the signal-to-noise ratio is, the higher the channel quality will be, or vice versa.

In some cases, the numerical value of channel quality information may be negatively correlated to the channel quality. That is, the larger the value of the channel quality information (such as noise power) is, the lower the channel quality will be, and the lower the value of the channel quality information is, the higher the channel quality will be.

In an embodiment of the present disclosure, the channel quality information of the above station may be channel quality information from an AP associated with the station and/or a non-associated AP adjacent to the station to the station.

At step 202, multicast optimization information for the at least two APs is generated based on the station information lists of the at least two APs respectively. The multicast optimization information for the at least two APs indicates multicast rates of the at least two APs and multicast receiving stations of the at least two APs.

In a possible implementation, the multicast optimization device generates corresponding multicast optimization information for each AP.

To summarize, with the solution shown in the embodiment of the present disclosure, for a WLAN scenario with at least two APs, a multicast optimization device can obtain channel quality information of stations associated with each of the at least two APs, and optimize multicast of the at least two APs based on the channel quality information of the stations associated with each of the at least two APs and whether the stations associated each of the at least two APs are OBSS stations, so as to optimize the multicast rates of the at least two APs and for which stations each of the at least two APs is to provide multicast services. Compared with the solution of setting the multicast rate to a low fixed value, the above solution of the present disclosure can adaptively adjust the relationship between the multicast rate and multicast reception based on combining the channel quality between the stations associated with the multiple APs and the associated APs and adjacent APs, so as to increase the multicast rate while ensuring the stability of the multicast service. That is, the stations to be served by each AP and the multicast rate of each AP can be optimized based on the channel quality of the OBSS stations and non-OBSS stations associated with each AP, without having to set the multicast rate of each AP to a fixed value, thereby improving the multicast transmission efficiency in the multi-AP scenario.

Referring to FIG. 3, which is a flowchart illustrating a multicast transmission control method according to an embodiment of the present disclosure. The multicast transmission control method may be performed by a second AP, which may be one of at least two APs (e.g., the access point 20 in the network architecture shown in FIG. 1). The method may include the following steps.

At step 301, a station information list of the second AP is obtained. A station information list of a target AP includes channel quality information of a first-type station associated with the target AP and channel quality information of a second-type station associated with the target AP. The first-type station is a station in an OBSS and the second-type station is a station not in the OBSS.

Here, the target AP is any one of the at least two APs.

At step 302, the station information list of the second AP is transmitted to a multicast optimization device, such that the multicast optimization device generates multicast optimization information for the at least two APs based on the station information lists of the at least two APs respectively. The multicast optimization information for the at least two APs indicates multicast rates of the at least two APs and multicast receiving stations of the at least two APs.

To summarize, with the solution shown in the embodiment of the present disclosure, for a WLAN scenario with at least two APs, a multicast optimization device can obtain channel quality information of stations associated with each of the at least two APs, and optimize multicast of the at least two APs based on the channel quality information of the stations associated with each of the at least two APs and whether the stations associated each of the at least two APs are OBSS stations, so as to optimize the multicast rates of the at least two APs and for which stations each of the at least two APs is to provide multicast services. Compared with the solution of setting the multicast rate to a low fixed value, the above solution of the present disclosure can adaptively adjust the relationship between the multicast rate and multicast reception based on the channel quality between the stations associated with the multiple APs and the associated APs and adjacent APs, so as to increase the multicast rate while ensuring the stability of the multicast service.

The technical solution uses multi-AP cooperation to perform an optimization process on STAs located in an OBSS in an optimization group (that is, they can receive signals from the multiple APs). These OBSS STAs are located at the edge of the coverage of their respective associated APs (that is, the associated APs of STAs). Compared with BSS STAs (which can only receive signals from associated APs), they are likely to have poorer channel quality, which probably determines the lower limit of the multicast transmission rate of their associated APs. If one of the APs from which these OBSS STAs can receive signals performs multicast transmission at a lower rate, it is possible for these STAs to receive data packets from the AP, whether to actually receive the data packets needs to meet a certain optimization condition that guarantees the packet reception rate of these STAs in receiving packets from neighboring APs. The associated AP can then perform a multicast transmission to other associated STAs at a higher rate. Reference can be made to FIG. 4, which is a schematic diagram showing multicast optimization according to an exemplary embodiment of the present disclosure.

In FIG. 4, all APs process the same multicast service, that is, multicast the same content. Each STA is associated with the corresponding AP, the solid line represents the association relationship, and the dotted line represents that the STA can receive signals from neighboring APs of the station, i.e., the STA is located in the OBSS. As shown in FIG. 4, STA1, STA5, and STA7 are OBSS STAs.

In a possible implementation, it is assumed that STA1 has the worst channel state among the STAs associated with AP1, which determines the lower limit of the current multicast transmission rate of AP1. AP2 is a neighboring AP of STA1. If the multicast rate of AP2 is lower than the multicast rate of AP1, and the determined multicast rate from AP2 to STA1 is greater than the determined multicast rate from AP2 to STA5 (optimization condition), then STA1 can receive data packets from AP2 and the optimization condition guarantees the service quality for STA2. Afterwards, AP1 can multicast at a higher rate to the remaining members STA3, STA4, and STA2 in the multicast group.

The process of the present disclosure includes a station information list maintenance process part and a multicast optimization process part. When the multicast optimization process part is performed by a master AP, the process of the present disclosure further includes a master AP election process part.

Figure 5:
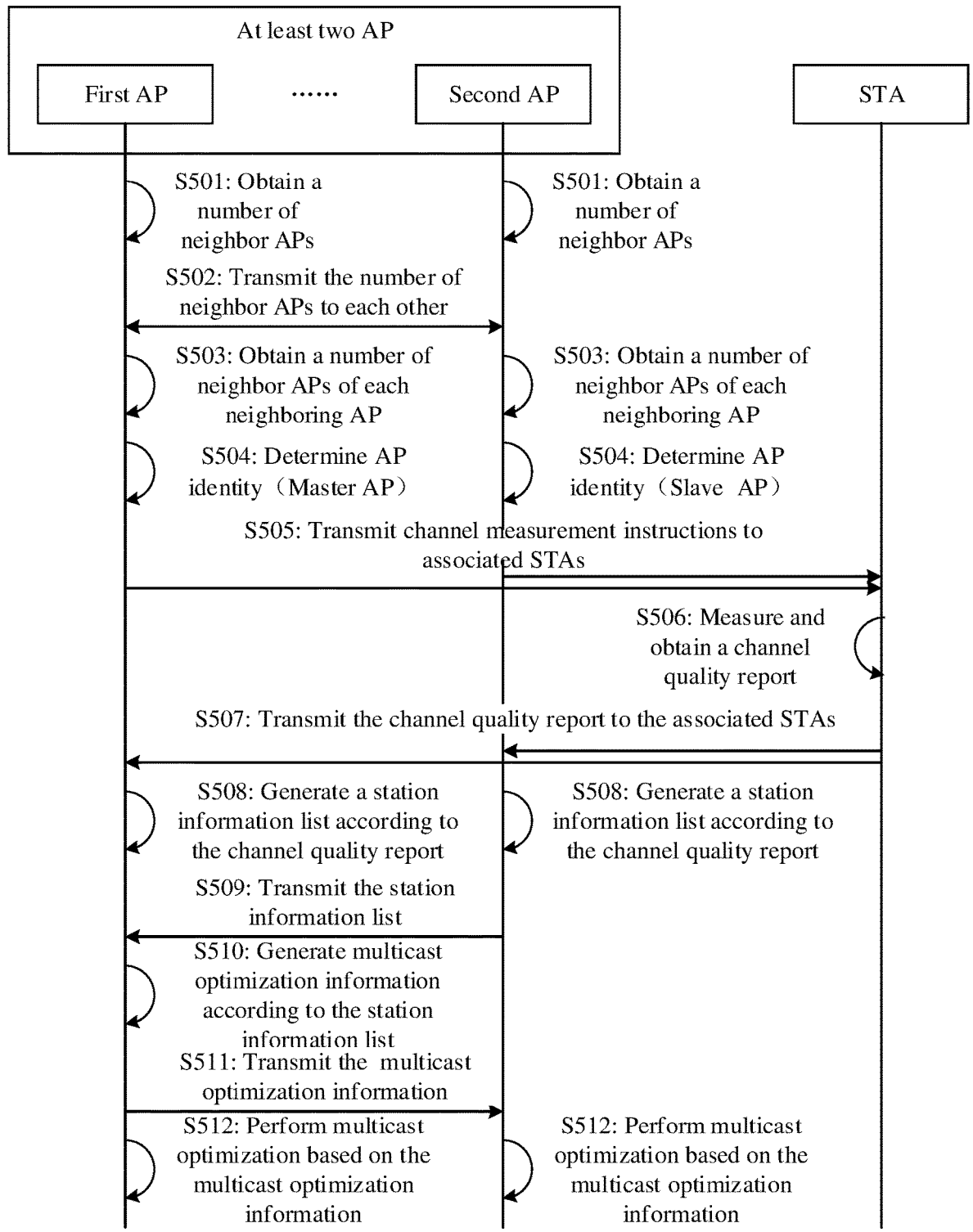
FIG. 5 is a flowchart illustrating a multicast transmission control method according to an embodiment of the present disclosure.

In an example, the multicast optimization part in the solution of the present disclosure is performed by a master AP of at least two APs, referring to FIG. 5, which is a flowchart illustrating a multicast transmission control method according to an embodiment of the present disclosure. The method can be performed by the at least two APs and stations associated with the at least two APs. Here, the above AP may be the access point 20 in the network architecture shown in FIG. 1, and the above station may be the access point 20 in the network architecture shown in FIG. 1. As shown in FIG. 5, the method may include the following steps.

At step 501, each of the at least two APs obtains a number of neighbor APs, the number of neighbor APs being a number of neighbor APs of the corresponding AP.

For a first AP of the at least two APs, the number of neighbor APs of the first AP is obtained.

For a second AP of the at least two APs, the number of neighbor APs of the second AP is obtained.

Here, the first AP is any one of the at least two APs, and the second AP is any one of the at least two APs other than the first AP.

For optimized design for intensive scenarios such as sports events, video conferencing, and smart classrooms according to this solution as an example, for small scenarios such as video conferencing and smart classrooms, an optimization group can be provided. The optimization group consists of a master AP and several slave APs. There are at least two APs in the optimization group. The master AP can receive signals from all the slave APs, and the master AP is responsible for transmitting instructions to the slave APs to collect information lists of the slave APs and optimize the multicast rate, and finally indicate the optimization result to the slave APs.

Referring to FIG. 6 and FIG. 7, which are schematic diagrams showing two optimization group deployments in the embodiment of the present disclosure. FIG. 6 shows a case where there are only two APs, and the two APs can receive each other's signals, thus the two APs are equal and any one of them can be selected as the master AP. FIG. 7 shows a multi-AP case where AP2 can receive signals from AP1 and AP3, but AP1 and AP3 cannot receive signals from each other, and thus AP2 is selected as the master AP.

At step 502, the at least two APs transmit their respective numbers of neighbor APs.

In a possible implementation, the at least two APs transmit their respective numbers of neighbor APs via a beacon frame.

Alternatively, the at least two APs may transmit their respective numbers of neighbor APs via other wireless signal frames.

For the first AP of the at least two APs, the number of neighbor APs of the first AP is transmitted via a beacon frame.

For the second AP of the at least two APs, the number of neighbor APs of the second AP is transmitted via a beacon frame.

In a possible implementation, for the first AP, the number of neighbor APs of the first AP being transmitted in the beacon frame may include:
- when the number of neighbor APs of the first AP is greater than a threshold number of neighbor APs, the number of neighbor APs of the first AP being transmitted via the beacon frame within a first time period; or
- when the number of neighbor APs of the first AP is not greater than the threshold number of neighbor APs, the number of neighbor APs of the first AP being transmitted via the beacon frame within a second time period.

In a possible implementation, for the second AP, the number of neighbor APs of the second AP being transmitted in the beacon frame may include:

when the number of neighbor APs of the second AP is greater than a threshold number of neighbor APs, the number of neighbor APs of the second AP being transmitted via the beacon frame within a first time period; or when the number of neighbor APs of the second AP is not greater than the threshold number of neighbor APs, the number of neighbor APs of the second AP being transmitted via the beacon frame within a second time period.

Here, the first time period is earlier than the second time period.

At step 503, the at least two APs obtain a number of neighbor APs of each neighboring AP from a beacon frame transmitted by the neighboring AP.

At step 504, the at least two APs determine AP identities according to their own numbers of neighbor APs and the respective numbers of neighbor APs of each neighboring AP, and the AP identities include master AP or slave AP.

For example, for the first AP of the at least two APs, when the number of neighbor APs of each neighboring AP of the first AP is smaller than the number of neighbor APs of the first AP, the first AP may be determined as the master AP of the at least two APs.

In another example, for the second AP of the at least two APs, when the number of neighbor APs of any one of the neighboring APs of the second AP is not smaller than the number of neighbor APs of the second AP, the second AP may be determined as the master AP of the at least two APs.

In a possible implementation, for the above second AP, the second AP may transmit declaration information to the multicast optimization device (i.e., the first AP). The declaration information declares that the corresponding AP is the slave AP among the at least two APs. Correspondingly, the first AP receives the declaration information transmitted by the second AP, and the declaration information declares that the corresponding AP is the slave AP among the at least two APs. The second AP is any one of the at least two APs other than the first AP.

For small scenarios such as video conferencing and smart classrooms, the number of optimization groups is small, and the radio environment is simple. The selection of the master AP can be directly determined when the optimization groups are deployed. For larger scenarios such as sports arenas, multiple optimization groups need to be deployed to solve the coverage problem. The following describes the selection of the master AP in large-scale scenarios.

This process is completed in two time periods. The first time period is for master AP selection. Each AP in the scenario performs master AP selection during the master AP selection time period. At the beginning, each AP determines the number of neighbor APs, and puts the number information into in a beacon frame. Referring to FIG. 8, which is a schematic diagram showing an element carrying the number information in the embodiment of the present disclosure, the element is a newly added element. The Information field has a length of 1 byte and indicates the number of neighbor APs. When the number of neighbor APs of an AP is greater than a number threshold, the AP transmits the beacon frame carrying the element of the number of neighbor APs in a first sub-time-period of the first time period, otherwise it transmits the beacon frame carrying the element of the number of neighbor APs in a second sub-time-period of the first time period. This ensures that the AP with a large number of APs can transmit the beacon frame carrying the element of the number of neighbor APs with a higher priority. Among the APs in the same transmitting time period, the AP that seizes the transmission opportunity first can transmit the beacon frame first. When an AP receives a beacon frame having the number of neighbor APs greater than its own number of neighbor APs for the first time, the AP becomes a slave AP and does not transmit beacon frames thereafter. At the end of the first time period, the AP that has not become a slave AP automatically become the master AP. In the second time period, each slave AP puts a master AP information element (i.e., the above declaration information) in the beacon frame and transmits it to inform the master AP of its presence. Referring to FIG. 9, which is a schematic diagram showing a master AP information element in the embodiment of the present disclosure. As shown in FIG. 9, the master AP information element is a newly added information element. A BSS ID field in the master AP information element identifies the master AP information. When the master AP determines that the information element matches itself, it can know the presence of the slave AP.

At step 505, the at least two APs transmit a channel measurement indication to associated STAs. The channel measurement indication indicates measurement parameters including a measurement channel and measurement time.

For the first AP of the at least two APs, it transmits a channel measurement indication to each STA associated with the first AP.

For the second AP of the at least two APs, it transmits a channel measurement indication is transmitted to each STA associated with the second AP.

At step 506, each STA performs channel measurement according to the channel measurement indication, and obtains a channel quality report indicating channel quality from each AP around the corresponding STA to the corresponding STA.

At step 507, each STA transmits the channel quality report to the associated AP, and correspondingly, the at least two APs receive the channel quality reports transmitted by their respective associated STAs.

For the first AP of the at least two APs, it receives channel quality reports transmitted by the STAs associated with the first AP.

For the second AP of the at least two APs, it receives channel quality reports transmitted by the STAs associated with the second AP.

At step 508, the at least two APs generate their corresponding station information lists respectively according to the channel quality reports transmitted by their respective associated STAs.

For the first AP of the at least two APs, it generates the station information list of the first AP according to the channel quality reports transmitted by the STAs associated with the first AP.

For the second AP of the at least two APs, it generates the station information list of the second AP according to the channel quality reports transmitted by the STAs associated with the second AP.

Here, the station information list of a target AP includes the channel quality information of a first-type station associated with the target AP and the channel quality information of a second-type station associated with the target AP. The first-type station is a station in an Overlapping Basic Service Set (OBSS), and the second-type station is a station not in the OBSS.

The target AP is any one of the at least two APs.

In a possible implementation, the station information list of the target AP may include:

an identifier of the first-type station associated with the target AP;

channel quality information from the target AP to the associated first-type station;

channel quality information from a near-station AP of the first-type station associated with the target AP to the first-type station associated with the target AP, the near-station AP being one of the at least two APs, other than the associated AP, that has highest channel quality with the corresponding station;

an identifier of the near-station AP of the first-type station associated with the target AP;

an identifier of the second-type station associated with the target AP; and channel quality information from the target AP to the associated second-type station.

In an embodiment of the present disclosure, a near-station AP refers to an AP with the highest channel quality to the station among non-associated APs of the station.

For example, assuming that there are 3 APs near a station, AP1, AP2, and AP3, and the station is associated with AP1, and the station can be covered by both AP2 and AP3 (that is, it can receive signals from AP2 and AP3), AP2 and AP3 are non-associated APs of the station, and among the two APs, AP2 and AP3, the AP with the highest channel quality to the station is called the near-station AP of the station.

At step 509, slave AP among the at least two APs transmits the station information list to the master AP, and correspondingly, the master AP receives the station information list transmitted by each slave AP.

For the second AP among the slave APs as an example, in the embodiment of the present disclosure, the second AP transmits the station information list of the second AP to the first AP, and correspondingly, the first AP receives the station information list transmitted by the second AP.

Figure 10:
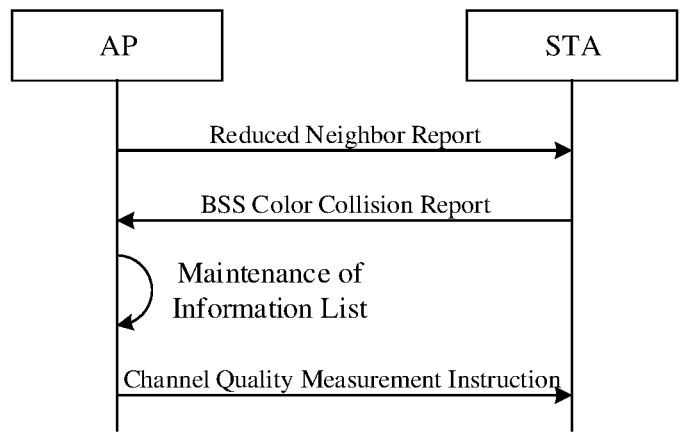
FIG. 10 is a schematic diagram showing a process of an AP indicating measured quality information to a station in the embodiment shown in FIG. 5.

Referring to FIG. 10, which is a schematic diagram showing a process of an AP indicating measurement quality information to a station according to an embodiment of the present disclosure, APs transmit Reduced Neighbor Reports (RNRs) to STAs, and the STAs in the OBSS transmit BSS Color Collision Reports to their associated APs. The RNR exists in beacon frames and probe response frames transmitted by the APs, containing channels and other information of nearby APs. The OBSS STAs can learn about the nearby APs and their channels by receiving these reports. When the OBSS STAs detect BSS color collision, they transmit BSS color collision reports to their associated APs, and the associated APs can know the STA user types (i.e., whether in the OBSS or not) according to the reports, and then maintain the information lists (the detailed description of the information list is in Part 2, Stage 1 in the process of the solution). After that, the APs transmit instructions for the OBSS STAs to perform channel quality measurement on nearby APs, the instructions including information on the channels to be measured by the OBSS STAs, measurement start time and measurement duration. The information is from the RNRs generated by the APs. Then, the OBSS STAs receive and measure Null Data Packet (NDP) frames from the nearby APs (described in Part 2) on the channels to be measured at the specified measurement start time according to the instructions, and locally cache a best measurement result and a MAC address of the corresponding AP. One of the nearby APs that has the best channel quality from the OBSS STAs is defined as the near AP.

Figure 11:
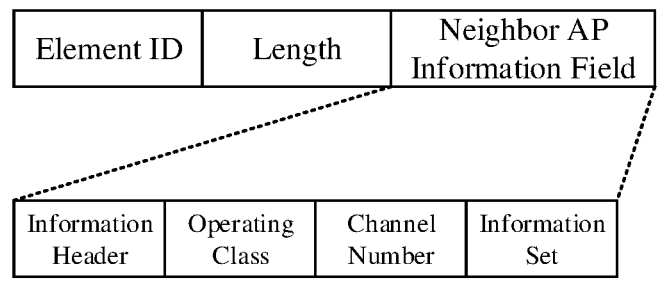
FIG. 11 is a frame format of an RNR in the embodiment shown in FIG. 5.

Here, no prioritization is provided between the RNR and the BSS color collision. Referring to FIG. 11, which shows a frame format of an RNR in the embodiment of the present disclosure, the length of the Operating Class field is 1 byte, which indicates a channel start frequency. This field together with the Channel Number field indicates the main channel information. The length of the Channel Number field is 1 byte, and it indicates the last known main channel of the APs in the Neighbor AP Information field. These two fields together indicate the main channel related information.

The BSS color is used to identify the BSS. Each PPDU carries BSS color information, which can help an STA receiving a PPDU to know which BSS the PPDU comes from. The BSS color collision report utilizes the relevant content in 802.11ax. This report is used by the STA to notify the AP whether a BSS color collision occurs, and the report carries the BSS color information detected by the OBSS STA. In more detail, the length of the event report field of the BSS color collision event report is 8 bytes, where each bit represents a BSS color value. A bit of 1 indicates that the BSS color corresponding to the bit as detected by the STA has been used by the OBSS.

Figure 12:
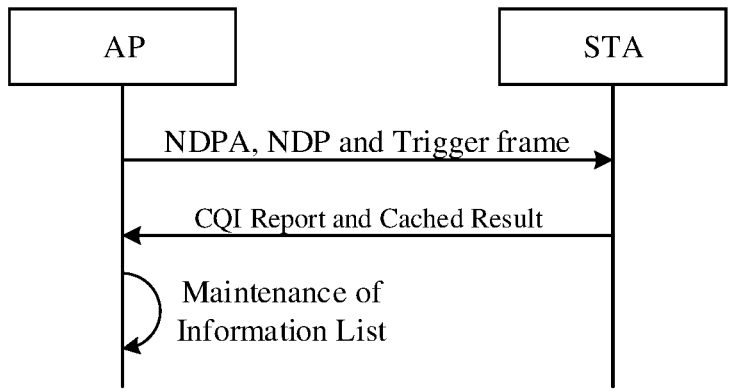
FIG. 12 is a schematic diagram showing a process of an AP collecting quality information of stations in the embodiment shown in FIG. 5.

Referring to FIG. 12, which is a schematic diagram showing a process of an AP collecting quality information of stations in an embodiment of the present disclosure, APs transmit NDPA frames, NDP frames and trigger frames to make STAs reply channel quality information reports (CQI Reports) and cached results. The NDPA frames are used to initialize a sensing process, including allocating resources, specifying feedback types, etc. The NDP frames are received by the STAs for channel quality measurement. The trigger frames are used to trigger the STAs to reply CQI reports. In the CQI reports, the channel quality is measured in terms of signal-to-noise ratio.

Remarks: The APs collect the channel quality of the STAs using a part of the sensing protocol in 802.11ax. In the 802.11ax standard, transmission beamforming and downlink MU-MIMO need to know the channel state information to calculate a training matrix. This matrix is used to optimize reception by one or more receivers. The STAs utilize the sensing protocol to determine the channel state information.

Figure 13:
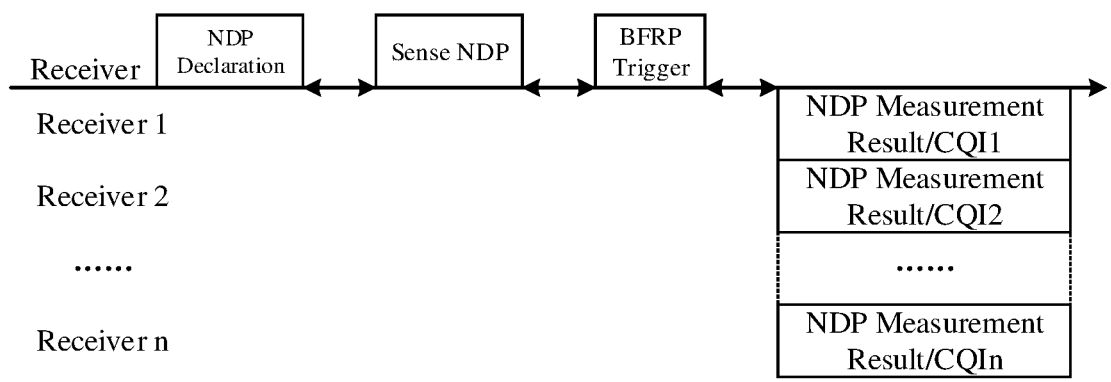
FIG. 13 is a schematic diagram showing a sensing protocol in a case of multiple receiving terminals in the embodiment shown in FIG. 5.

Referring to FIG. 13, which is a schematic diagram showing a sensing protocol in the case of multiple receiving terminals in an embodiment of the present disclosure, multiple receiving terminals (beamformees) use OFDMA to reply to CQI reports at the same time, which solves the problem of information collection in dense user scenarios. When there are multiple receiving terminals, a receiving address of an NDP frame will be set as a broadcast address, such that STAs in OBSS can also receive NDP frames of nearby APs to measure their channel quality information.

In the process of the STA replying the CQI report to the AP, this technical solution enables the STA to reply the CQI report and the cached result together to the AP. The AP maintains an information list locally according to the received information. Each information list contains information about all OBSS STAs associated with the AP and a BSS STA with the worst channel quality. The reason for this is that all OBSS STAs may be the object for which multicast rate optimization is to be performed. The information on the BSS STAs is a potential termination condition of the multicast rate optimization process. The information on the OBSS STAs includes a MAC address of the STA, an SNR from the STA to the associated AP, MAC addresses of neighboring APs of the STA, and a user type (i.e., OBSS user). The information on the BSS STAs includes a MAC address of the STA, an SNR from the STA to the associated AP, and a user type (i.e., BSS user).

Here, the content of the information list may be shown in Table 1 below:

TABLE 1

| MAC address of STA1 | SNR from STA1 to associated AP | MAC addresses of neighboring APs | SRNs from STA1 to neighboring APs | 1 (OBSS user) |
|---|---|---|---|---|
| MAC address of STA2 | SNR from STA2 to associated AP | MAC addresses of neighboring APs | SRNs from STA2 to neighboring APs | 1 (OBSS user) |
| MAC address of STA3 | SNR from STA3 to associated AP | MAC addresses of neighboring APs | SRNs from STA3 to neighboring APs | 1 (OBSS user) |
| . . . | . . . | . . . | . . . | 1 (OBSS user) |
| MAC address of STAn | SNR from STAn to associated AP | / | / | 0 (BSS user) |

At this stage, frame format design needs to be carried out for the "measurement indication for neighboring APs" frame in Part 1 and the "CQI+cached result" reply frame, or referred to as CQI reply frame, in Part 2. Here we use the action frame in the management frame category to carry the information interacted at this stage. An action frame is originally used to require an STA to take a necessary action. We add new functional modules on the AP and STA sides to parse these action frames. Referring to FIG. 14, which shows a frame format of the action frame in the embodiment of the present disclosure. Basically, an action frame is a Category field plus an Action (action details) field.

The Category field identifies the category of the action frame, with a length of one byte, capable of identifying 256 categories of action frames. There are 24 categories used in the 802.11 standard, 104 categories are reserved, and the remaining 128 categories are not used. Because there are still a number of reserved categories, this technical solution will use the reserved categories to identify the frames designed according to this technical solution, that is, add a new type of action frame.

Referring to FIG. 15, which is a frame format of the "measurement indication for neighboring APs" frame in the embodiment of the present disclosure, the main change is that a new element is added to carry the indication information, i.e., the neighboring AP element. The Element ID field has a length of 1 byte and identifies the function of the element. In the 802.11 standard, there are a number of function identifiers reserved for the Element ID, and thus the neighboring AP element here is designed as a new element. The length of the Length field is 1 byte, and identifies the length of the Information field. The Information field has a variable length and contains several entry of measurement information. As shown in the figure, one measurement information entry includes a Channel Number field, a Start time field, and a Duration field. The Channel Number field indicates a channel to be measured, and the information in this field comes from the RNR generated by the AP. The Start Time field indicates the time at which the measurement starts. The Duration field indicates the duration for measuring the channel. After parsing the information, the STA needs to receive the NDP frames over these channels at a specified time to measure the channel quality information.

Referring to FIG. 16, which is a schematic diagram showing a format of a CQI reply frame in the embodiment of the present disclosure, a CQI Report field, an STA's SNR For Neighbor AP field, and a Neighbor AP's MAC Address field are added. The CQI Report field reuses the CQI Report field in the 802.11ax, has a variable length, and carries CQI information. The STA's SNR For Neighbor AP field is used to carry the best channel quality measurement result from the STA to all neighboring APs. The Neighbor AP's MAC Address field is used to carry the MAC address of the neighboring AP. The details of the STA's SNR For Neighbor AP field are shown in Table 2. The length of this field is one byte, which represents an unsigned integer with the maximum value of 255. There is a mapping relationship between this integer and the channel quality SNR (in dB). The integer 0 means smaller than or equal to −13 dB, the integer 255 means greater than or equal to 50.75 dB, and the other integers are certain values, which change in units of 0.25 dB.

TABLE 2

| STA's SNR for Neighbor AP Field | SNR (dB) |
|---|---|
| 0 | ≤−13 |
| 1 | −12.75 |
| 2 | −12.50 |
| . . . | . . . |
| 254 | 50.50 |
| 255 | ≥50.75 |

At Step 510, the first AP generates multicast optimization information for the at least two APs respectively according to the station information lists of the at least two APs.

Here, the multicast optimization information for the at least two APs indicates the multicast rates of the at least two APs and the multicast receiving stations of the at least two APs.

In a possible implementation, the operation of generating the multicast optimization information for the at least two APs based on the station information lists of the at least two APs respectively may include:

obtaining initial optimization parameters for the at least two APs based on the station information lists of the at least two APs, the optimization parameters comprising target channel quality information and a target station corresponding to the target channel quality information, the initial target channel quality information being channel quality information having lowest channel quality in the station information list of the corresponding AP;

performing multicast optimization on the at least two APs in an ascending order of the channel quality of the initial target channel quality information, to obtain the respective multicast rates of the at least two APs and the respective multicast receiving stations of the at least two APs; and generating the multicast optimization information respectively for the at least two APs based on the respective multicast rates of the at least two APs and the respective multicast receiving stations of the at least two APs.

In a possible implementation, the operation of performing multicast optimization on the at least two APs in the ascending order of the channel quality of the initial target channel quality information may include:

obtaining, for a first AP of the at least two APs, a multicast rate of the first AP based on the initial target channel quality information of the first AP.

In a possible implementation, the operation of performing multicast optimization on the at least two APs in the ascending order of the channel quality of the initial target channel quality information may include:
- setting, for an i-th AP of the at least two APs when the target station of the i-th AP is the first-type station and an optimization condition is met, the target station of the i-th AP as the multicast receiving station of the near-station AP of the target station of the i-th AP, the optimization condition comprising: the channel quality of the target channel quality information of the i-th AP being higher than channel quality of channel quality information from the near-station AP to the target station of the i-th AP, and the channel quality of the channel quality information from the station-adjacent AP to the target station of the i-th AP being higher than channel quality of the target channel quality information of the near-station AP; and
- updating, when there are non-selected stations in the station information list of the i-th AP, one of the non-selected stations that has lowest channel quality corresponding to channel quality information as the target station of the i-th AP, the non-selected stations being stations not selected as the target station of the i-th AP.

In a possible implementation, the operation of performing multicast optimization on the at least two APs in the ascending order of the channel quality of the initial target channel quality information may further include:
- obtaining, when the target station of the i-th AP is the second-type station, or when the target station of the i-th AP is the first-type station and the optimization condition is not met, the multicast rate of the i-th AP based on the target channel quality information of the i-th AP.

At step 511, the first AP transmits, to other APs of the at least two APs, their respective multicast optimization information.

Taking the second AP as an example, the first AP transmits the multicast optimization information for the second AP to the second AP, and correspondingly, the second AP receives the multicast optimization information for the second AP.

At step 512, the at least two APs perform multicast optimization according to the corresponding multicast optimization information respectively.

In a possible implementation, for the first AP of the at least two APs, the multicast rate of the first AP may be set according to the multicast optimization information for the first AP.

In a possible implementation, for the first AP of the at least two APs, when the multicast optimization information for the first AP indicates that there is an optimized station among the stations associated with the first AP, a receiving instruction may be transmitted to the optimized station. The receiving instruction instructs the optimized station to receive multicast data from a corresponding near-station AP. Here, the optimized station is set as a multicast receiving station of the corresponding near-station AP.

In a possible implementation, for the second AP of the at least two APs, it receives the multicast optimization information for the second AP transmitted by the multicast optimization device (that is, the first AP), and sets the multicast rate of the second AP according to the multicast optimization information for the second AP.

In a possible implementation, for the second AP of the at least two APs, when the multicast optimization information for the second AP indicates that there is an optimized station among the stations associated with the second AP, a receiving instruction may be transmitted to the optimized station. The receiving instruction instructs the optimized station to receive multicast data from a corresponding near-station AP. Here, the optimized station is set as a multicast receiving station of the corresponding near-station AP.

Referring to FIG. 17, which is a schematic diagram showing multicast rate and station optimization in the embodiment of the present disclosure, each AP maintains an information list locally. In Stage 1, Part 2 of the process of the solution, the master AP mainly requests information lists and multicast optimization from the slave APs. As shown in FIG. 14, the master AP transmits an information list request to the slave APs, and the slave APs transmit information list responses to the master AP in response to the request. The information list information is included in information list response frames. After receiving the information lists of all slave APs, the master AP has the information lists of all APs in the optimization group, and then the master AP starts multicast optimization. After completion of the optimization, the master AP keeps its own optimization results and indicates the optimization results of the slave APs to the slave APs. After receiving the optimization results, the slave APs know what multicast rate they should use for multicast transmission currently, and which STAs in the OBSS of this AP need to receive data packets from neighboring APs.

Figure 18:
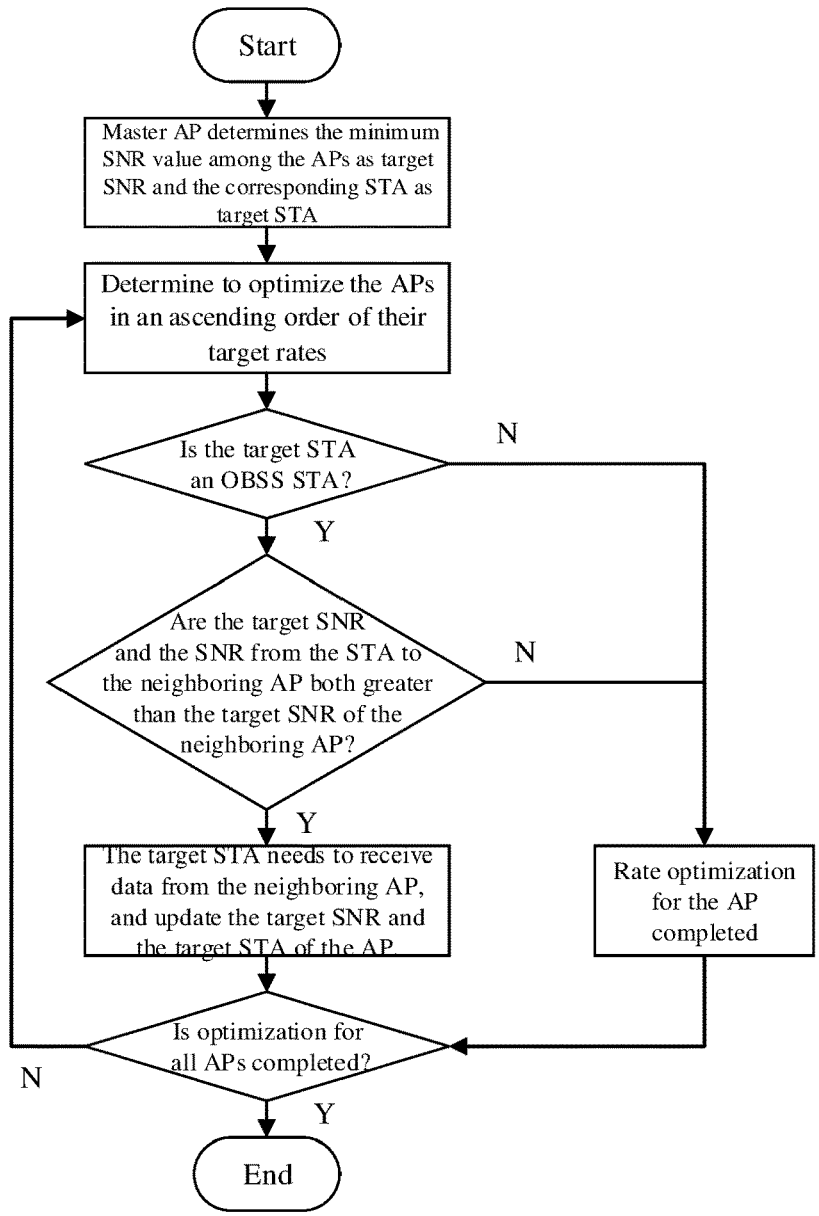
FIG. 18 is a flowchart illustrating multicast rate optimization in the embodiment shown in FIG. 5.

Referring to FIG. 18, which is a flowchart illustrating multicast rate optimization in an embodiment of the present disclosure, after receiving the information lists of all slave APs, the master AP has the information lists of all APs and can start the multicast rate optimization process. The SNRs from the STAs to the associated APs in the information lists determine the multicast rates of data packets from the associated APs to the STAs, and the SNR values from the STAs to the neighboring APs determine the theoretical multicast rate of data packets from the neighboring APs to the STAs. In fact, the neighboring APs will not multicast data packets to the STA.

1. First, the master AP determines, according to the SNR values of the STAs to the associated APs in the information lists, the minimum SNR value among the APs as the target SNR and the corresponding STA as the target STA.

2. The master AP optimizes the APs in an ascending order of the target SNR values of the APs.

The AP with the smallest target SNR value performs multicast transmission at the minimum rate in the entire optimization group. There are no APs near this AP with a lower multicast transmission rate than it, and thus the OBSS STAs of this AP cannot receive data packets from neighboring APs. Therefore, the multicast rate of the AP is determined. Optimizing the APs in this order can determine the multicast rate of each AP one by one without confusion.

3. Afterwards, the master AP determines whether the target STA of the currently optimized AP is an OBSS STA. If not, the optimization of the current AP has been completed, and the master AP can determine the multicast transmission rate of the AP according to the target SNR value of the AP. Here, BSS STAs can only receive signals from associated APs, and thus optimization cannot be performed. The target STA being a BSS STA is a condition for the AP to terminate rate optimization.

4. If the target STA is an OBSS STA, it is determined whether the optimization condition is met. The optimization condition is another condition for the AP to terminate rate optimization. That is, it is determined whether the target SNR value and the SNR value from the STA to the neighboring AP are both greater than the target SNR value of the neighboring AP, if not, the current AP optimization is completed, and the rate determined based on the target SNR value of the AP is the multicast transmission rate of the AP; or otherwise the STA becomes an optimized STA and needs to receive data packets from its neighboring APs.

Here, the target SNR value of the current AP being greater than the target SNR value of the neighboring AP of the target STA, which results in that the multicast rate of the neighboring AP of the target STA is smaller than the multicast rate of its associated AP, is a precondition for the target STA to receive data from the neighboring AP.

The SNR from the target STA to the neighboring AP being greater than the target SNR value of the neighboring AP is a condition that guarantees the service quality of the target STA when receiving data from the neighboring AP.

Afterwards, the currently optimized AP updates the target SNR and the target STA. The target STA is still the STA with the smallest SNR value from the STA to its associated AP, except the optimized STA. That is, each time the target is updated to select the STA with the worst channel quality. The SNR value is the target SNR. Then, the termination condition is determined, and the cycle repeats until all APs are optimized.

When all APs have been optimized, the entire multicast rate optimization process is completed. Afterwards, the master AP indicates the optimization result to the slave APs.

In this stage, the frame format design needs to be performed for the information list request frame, the information list response frame, and the optimization result indication frame.

Figure 19:
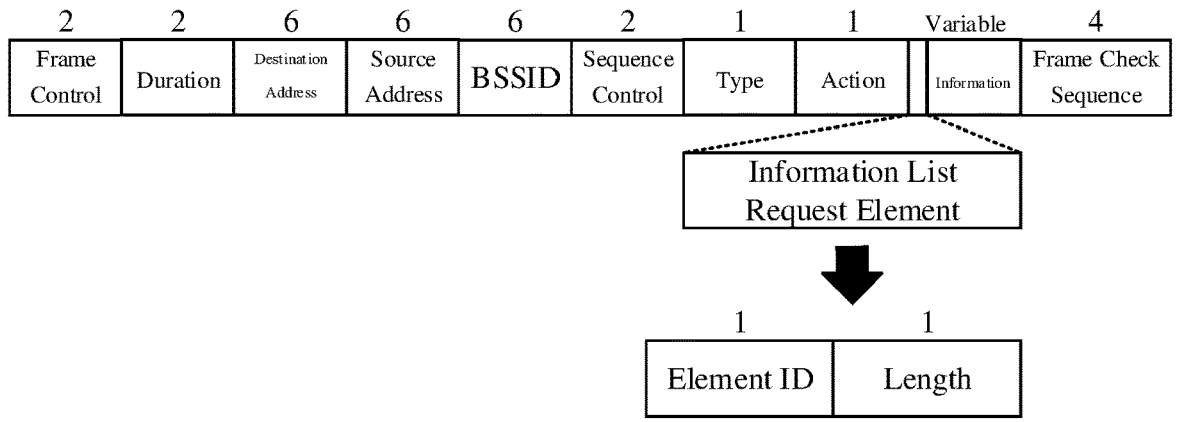
FIG. 19 is a schematic diagram showing an information list request frame format in the embodiment shown in FIG. 5.

Referring to FIG. 19, which is a schematic diagram showing a format of the information list request frame in the embodiment of the present disclosure, an Information List Request Element is newly added, and the Element ID field can indicate the request for the information list, and thus there is no need to add other fields for indication.

Figure 20:
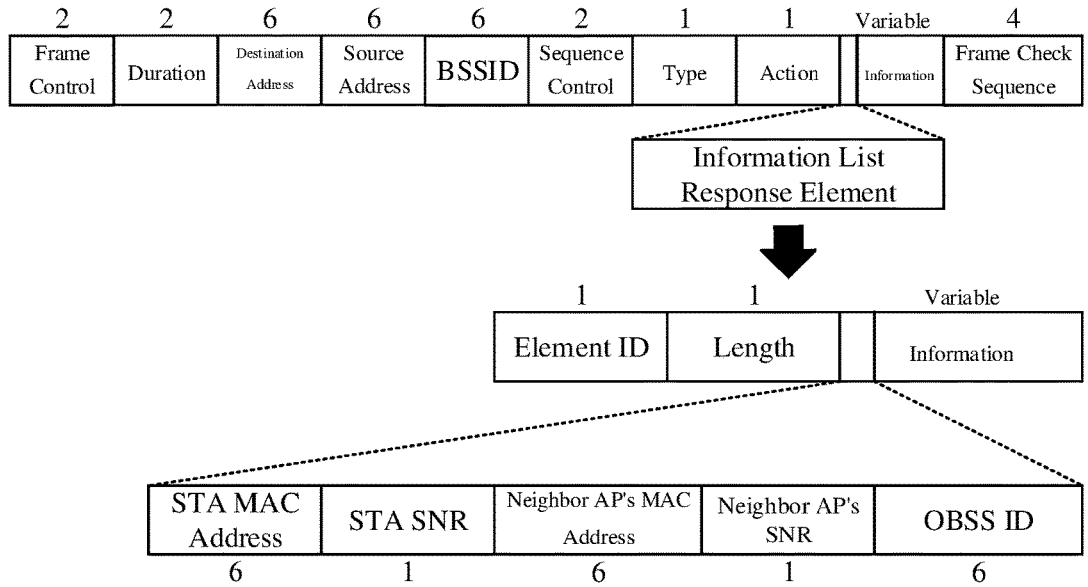
FIG. 20 shows an information list response frame format in the embodiment shown in FIG. 5.

Referring to FIG. 20, which shows a format of the information list response frame in the embodiment of the present disclosure, an Information List Response Element is newly added, and the Information field of this element has a variable length and is used to carry the information of the information list. A part of the Information field shown in the figure is a row of data in the information list. The settings of the STA SNR field and STA SNR for Neighbor AP field are the same as those shown in Table 2. For BSS STAs, the Neighbor AP's MAC Address field and the STA's SNR for Neighbor AP field are set to all 0s or all 1s to indicate null.

Figure 21:
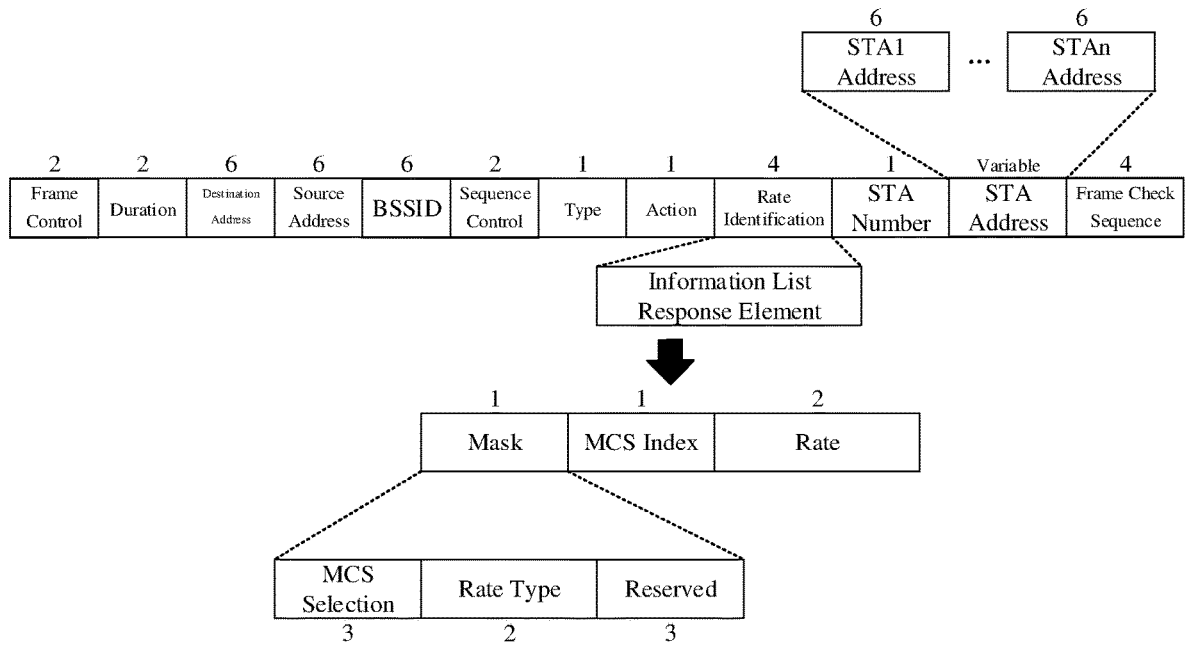
FIG. 21 shows an optimization result indication frame format in the embodiment shown in FIG. 5.

Referring to FIG. 21, which shows a format of the optimization result indication frame in the embodiment of the present disclosure, a Rate Identification field, a Number of STAs field, and an Addresses of STAs field are added. The rate identification field identifies the rate information, and the slave APs can know their multicast transmission rates after parsing this field. The Number of STAs field identifies the number of addresses in the Addresses of STAs field. The Addresses of STAs field carries the MAC addresses of the optimized OBSS STAs, such that the slave APs can transmit indication frames to these STAs to receive packets from neighboring APs.

The Rate Identification field in FIG. 21 reuses the Rate Identification field in the 802.11 standard. Here, the value of the MCS Selector subfield is different, and the MCS identified by the same MCS Index field changes. The MCS Index identifies the MCS scheme. A value of 0 in the Rate Type subfield indicates that the Rate field is reserved, a value of 1 indicates that the Rate field is a data rate in a basic rate set, and a value of 2 indicates that the Rate field is not a data rate in a basic rate set. The Rate field has a length of 2 bytes, which represents an unsigned integer, changing in units of 0.5 Mbps, and determines a PHY rate.

Figure 22:
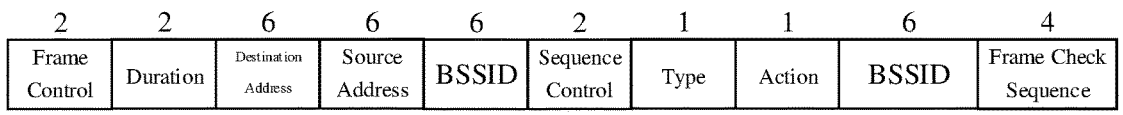
FIG. 22 shows an indication frame format in the embodiment shown in FIG. 5.

In response to receiving the optimization result indication frames, the slave APs need to transmit instructions to the STAs in the OBSS, such that these STAs can receive data packets from neighboring APs. Referring to FIG. 22, which shows a format of the instruction frame in the embodiment of the present disclosure, a BSSID for Receive field is newly added. After parsing this field, the OBSS STAs know that they need to receive data packets from the BSS.

Figure 23:
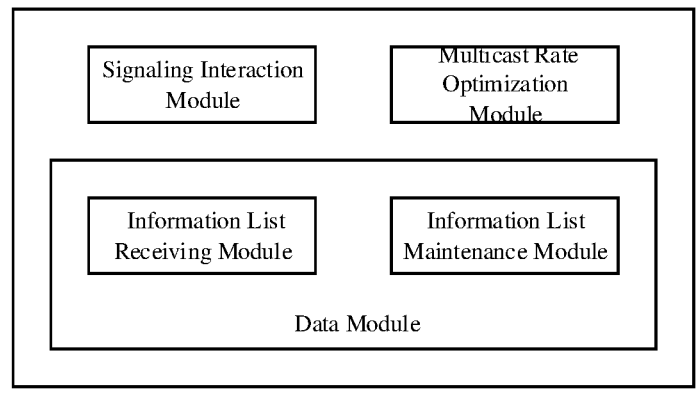
FIG. 23 is a schematic diagram showing functional modules of an AP in the embodiment shown in FIG. 5.

Referring to FIG. 23, which is a schematic diagram showing functional modules of each AP in the embodiment of the present disclosure, the functional modules of the AP include a signaling interaction module, a multicast rate optimization module, and a data module. The data module includes a data receiving module and an information list maintenance module.

The signaling interaction module is configured to perform signaling interaction between APs and between APs and STAs. For example, the APs transmit neighboring AP measurement instruction frames to OBSS STAs, the master AP transmits information list request frames to the slave APs, the slave APs transmit information list response frames to the master AP in response to the request, the master AP transmits optimization result indication frames to the slave APs, the APs transmit instructions frames to the OBSS STAs for receiving data neighboring APs, the APs parse the CQI reply frames transmitted by the STAs, and the master AP analyzes information list response frames transmitted from the APs.

The multicast rate optimization module: the master AP optimizes the multicast rate according to the information in the information list receiving module and the information list maintenance module, and indicates the optimization results to the slave APs and the OBSS STAs of the AP via the signaling interaction module.

The data module: the data module includes an information list receiving module and an information list maintenance module. The information list receiving module is configured for the master AP to receive the information lists transmitted from the slave APs. The information list maintenance module is configured to record the information list of this AP.

Figure 24:
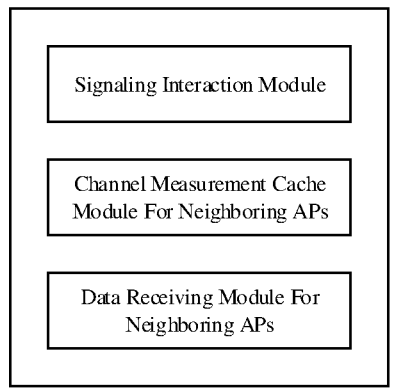
FIG. 24 is a schematic diagram showing functional modules of an STA in the embodiment shown in FIG. 5.

Referring to FIG. 24, which is a schematic diagram showing functional modules of an STA in the embodiment of the present disclosure, the STA includes a signaling interaction module and a data receiving module for neighboring APs.

The signaling interaction module is configured to perform signaling interaction between APs and STAs. For example, the STAs transmit CQI reply frames to the APs, and parse instruction frames from the APs.

A channel measurement cache module for neighboring APs records the best channel measurement results of all APs in the vicinity of the OBSS STAs and the MAC address of the corresponding AP.

The data receiving module for neighboring APs is configured to enable the STAs to receive data packets from neighboring APs.

To summarize, with the solution shown in the embodiment of the present disclosure, for a WLAN scenario with at least two APs, a multicast optimization device can obtain channel quality information of stations associated with each of the at least two APs, and optimize multicast of the at least two APs based on the channel quality information of the stations associated with each of the at least two APs and whether the stations associated each of the at least two APs are OBSS stations, so as to optimize the multicast rates of the at least two APs and for which stations each of the at least two APs is to provide multicast services. Compared with the solution of setting the multicast rate to a low fixed value, the above solution of the present disclosure can adaptively adjust the relationship between the multicast rate and multicast reception based on combining the channel quality between the stations associated with the multiple APs and the associated APs and adjacent APs, so as to increase the multicast rate while ensuring the stability of the multicast service. That is, the stations to be served by each AP and the multicast rate of each AP can be optimized based on the channel quality of the OBSS stations and non-OBSS stations associated with each AP, without having to set the multicast rate of each AP to a fixed value, thereby improving the multicast transmission efficiency in the multi-AP scenario.

In the following, the apparatus embodiments of the present disclosure will be described, which can be used to implement the method embodiments of the present disclosure. For details not disclosed in the apparatus embodiments of the present disclosure, reference can be made to the method embodiments of the present disclosure.

Figure 25:
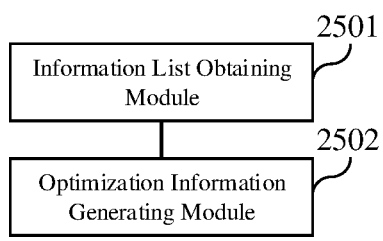
FIG. 25 is a block diagram of a multicast transmission control apparatus according to an embodiment of the present disclosure.

Referring to FIG. 25, which shows a block diagram of a multicast transmission control apparatus according to an embodiment of the present disclosure, the apparatus is applied in a multicast optimization device, and has the function of implementing the steps performed by the multicast optimization device/first AP in the method shown in FIG. 2 or FIG. 5 above. As shown in FIG. 25, the apparatus may include:

an information list obtaining module 2501 configured to obtain station information lists of at least two wireless Access Points (APs), the station information list of a target AP including channel quality information of a first-type station associated with the target AP and channel quality information of a second-type station associated with the target AP, the first-type station being a station in an Overlapping Basic Service Set (OBSS) and the second-type station being a station not in the OBSS, the target AP being any one of the at least two APs; and an optimization information generating module 2502 configured to generate multicast optimization information for the at least two APs based on the station information lists of the at least two APs respectively, the multicast optimization information for the at least two APs indicating multicast rates of the at least two APs and multicast receiving stations of the at least two APs.

In a possible implementation, the station information list of the target AP may include:

an identifier of the first-type station associated with the target AP;

channel quality information from the target AP to the associated first-type station;

channel quality information from a near-station AP of the first-type station associated with the target AP to the first-type station associated with the target AP, the near-station AP being one of the at least two APs, other than the associated AP, that has highest channel quality with the corresponding station;

an identifier of the near-station AP of the first-type station associated with the target AP;

an identifier of the second-type station associated with the target AP; and channel quality information from the target AP to the associated second-type station.

In a possible implementation, the optimization information generating module may include:

a parameter obtaining unit configured to obtain initial optimization parameters for the at least two APs based on the station information lists of the at least two APs, the optimization parameters comprising target channel quality information and a target station corresponding to the target channel quality information, the initial target channel quality information being channel quality information having lowest channel quality in the station information list of the corresponding AP;

a multicast optimizing unit configured to perform multicast optimization on the at least two APs in an ascending order of the channel quality of the initial target channel quality information, to obtain the respective multicast rates of the at least two APs and the respective multicast receiving stations of the at least two APs; and an information generating unit configured to generate the multicast optimization information for the at least two APs respectively based on the respective multicast rates of the at least two APs and the respective multicast receiving stations of the at least two APs.

In a possible implementation, the multicast optimizing unit may be configured to obtain, for a first AP of the at least two APs, a multicast rate of the first AP based on the initial target channel quality information of the first AP.

In a possible implementation, the multicast optimizing unit may be configured to:

set, for an i-th AP of the at least two APs when the target station of the i-th AP is the first-type station and an optimization condition is met, the target station of the i-th AP as the multicast receiving station of the near-station AP of the target station of the i-th AP, the optimization condition comprising: the channel quality of the target channel quality information of the i-th AP being higher than channel quality of channel quality information from the near-station AP to the target station of the i-th AP, and the channel quality of the channel quality information from the station-adjacent AP to the target station of the i-th AP being higher than channel quality of the target channel quality information of the near-station AP; and update, when there are non-selected stations in the station information list of the i-th AP, one of the non-selected stations that has lowest channel quality corresponding to channel quality information as the target station of the i-th AP, the non-selected stations being stations not selected as the target station of the i-th AP.

In a possible implementation, the multicast optimizing unit may be further configured to:

obtain, when the target station of the i-th AP is the second-type station, or when the target station of the i-th AP is the first-type station and the optimization condition is not met, the multicast rate of the i-th AP based on the target channel quality information of the i-th AP.

In a possible implementation, when the apparatus is applied in a first AP of the at least two APs, the information list obtaining module may be configured to:

receive a channel quality report transmitted by each STA associated with the first AP, the channel quality report indicating channel quality from each AP around the corresponding STA to the corresponding STA; and generate the station information list of the first AP based on channel quality reports transmitted by respective STAs associated with the first AP.

In a possible implementation, the information list obtaining module may be further configured to:

transmit, prior to receiving the channel quality report transmitted by each STA associated with the first AP, a channel measurement indication to each STA associated with the first AP, the channel measurement indication indicating measurement parameters comprising a measured channel and measurement time.

In a possible implementation, when the apparatus is applied in a first AP of the at least two APs, the apparatus may further include:

an optimization information transmitting module configured to transmit multicast optimization information for a second AP of the at least two APs to the second AP; the second AP being any one of the at least two APs other than the first AP.

In a possible implementation, when the apparatus is applied in a first AP of the at least two APs, the apparatus may further include:

a rate setting module configured to set the multicast rate of the first AP according to the multicast optimization information for the first AP.

In a possible implementation, when the apparatus is applied in a first AP of the at least two APs, the apparatus may further include:

an instruction transmitting module configured to transmit, when the multicast optimization information for the first AP indicates that there is an optimized station among stations associated with the first AP, a receiving instruction to the optimized station, the receiving instruction instructing the optimized station to receive multicast data from a corresponding near-station AP.

Here, the optimized station is set as a multicast receiving station of the corresponding near-station AP.

In a possible implementation, when the apparatus is applied in a first AP of the at least two APs, the apparatus may further include:

a number obtaining module configured to obtain, before the information list obtaining module obtains the station information lists of the at least two wireless APs, a number of neighbor APs of the first AP, the number of neighbor APs being a number of neighbor APs of the corresponding AP;

a number transmitting module configured to transmit the number of neighbor APs of the first AP via a beacon frame;

a beacon frame receiving module configured to receive a beacon frame transmitted by each neighboring AP;

the number obtaining module further configured to obtain a number of neighbor APs of each neighboring AP from the beacon frame transmitted by the neighboring AP, and a determining module configured to determine, when the number of neighbor APs of each neighboring AP is smaller than the number of neighbor APs of the first AP, the first AP as a master AP among the at least two APs.

In a possible implementation, the number transmitting module may be configured to:

transmit, when the number of neighbor APs of the first AP is greater than a threshold number of neighbor APs, the number of neighbor APs of the first AP via the beacon frame within a first time period; or transmit, when the number of neighbor APs of the first AP is not greater than the threshold number of neighbor APs, the number of neighbor APs of the first AP via the beacon frame within a second time period.

Here, the first time period is earlier than the second time period.

In a possible implementation, the apparatus may further include:

a declaration receiving module configured to receive declaration information transmitted by a second AP, the declaration information declaring that the corresponding AP is a slave AP among the at least two APs, the second AP being any one of the at least two APs other than the first AP.

Figure 26:
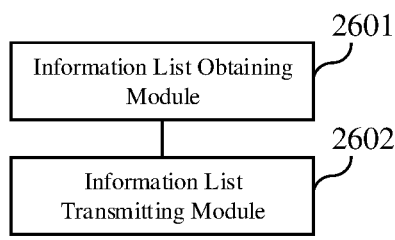
FIG. 26 is a block diagram of a multicast transmission control apparatus according to an embodiment of the present disclosure.

Referring to FIG. 26, which shows a block diagram of a multicast transmission control apparatus according to an embodiment of the present disclosure, the apparatus is applied in an AP, and has the function of implementing the steps performed by the second AP in the method shown in FIG. 3 or FIG. 5 above. As shown in FIG. 26, the apparatus may include:

an information list obtaining module 2601 configured to obtain a station information list of the second AP, a station information list of a target AP including channel quality information of a first-type station associated with the target AP and channel quality information of a second-type station associated with the target AP, the first-type station being a station in an Overlapping Basic Service Set (OBSS) and the second-type station being a station not in the OBSS, the target AP being any one of the at least two APs; and an information list transmitting module 2602 configured to transmit the station information list of the second AP to a multicast optimization device, such that the multicast optimization device generates multicast optimization information for the at least two APs based on the station information lists of the at least two APs respectively, the multicast optimization information for the at least two APs indicating multicast rates of the at least two APs and multicast receiving stations of the at least two APs.

In a possible implementation, the information list obtaining module may include:

a report receiving unit configured to receive a channel quality report transmitted by each STA associated with the second AP, the channel quality report indicating channel quality from each AP around the corresponding STA to the corresponding STA; and an information list generating unit configured to generate the station information list of the second AP based on channel quality reports transmitted by respective STAs associated with the second AP.

In a possible implementation, the information list obtaining module may further include:

a measurement indication transmitting unit configured to transmit, before the report receiving unit receives the channel quality report transmitted by each STA associated with the first AP, a channel measurement indication to each STA associated with the first AP, the channel measurement indication indicating measurement parameters comprising a measured channel and measurement time.

In a possible implementation, the apparatus may further include:

an optimization information receiving module configured to receive the multicast optimization information for the second AP transmitted by the multicast optimization device; and a rate setting module configured to set the multicast rate of the second AP according to the multicast optimization information for the second AP.

In a possible implementation, the apparatus may further include:
an instruction transmitting module configured to transmit, when the multicast optimization information for the second AP indicates that there is an optimized station among stations associated with the second AP, a receiving instruction to the optimized station, the receiving instruction instructing the optimized station to receive multicast data from a corresponding near-station AP.

Here, the optimized station is set as a multicast receiving station of the corresponding near-station AP.

In a possible implementation, the apparatus may further include:
a number obtaining module configured to obtain, before the information list obtaining module obtains the station information list of the second AP, a number of neighbor APs of the second AP, the number of neighbor APs being a number of neighboring APs of the corresponding AP;
a number transmitting module configured to transmit the number of neighbor APs of the second AP via a beacon frame;
a beacon frame receiving module configured to receive a beacon frame transmitted by each neighboring AP;
the number obtaining module being further configured to obtain a number of neighbor APs of each neighboring AP from the beacon frame transmitted by the neighboring AP; and
a determining module configured to determine, when the number of neighbor APs of any neighboring AP is greater than the number of neighbor APs of the second AP, the second AP as a slave AP among the at least two APs.

In a possible implementation, the number transmitting module may be configured to:
transmit, when the number of neighbor APs of the second AP is greater than a threshold number of neighbor APs, the number of neighbor APs of the second AP via the beacon frame within a first time period; or
transmit, when the number of neighbor APs of the second AP is not greater than the threshold number of neighbor APs, the number of neighbor APs of the second AP via the beacon frame within a second time period.

The first time period is earlier than the second time period.

In a possible implementation, the apparatus may further include:
a declaration transmitting module configured to transmit declaration information to the multicast optimization device, the declaration information declaring that the corresponding AP is a slave AP among the at least two APs.

It should be noted that, when the apparatus provided in any of the above embodiments achieves its functions, the division of the above functional modules is provided for the purpose of illustration only. In practice, the above functions can be allocated to different functional modules depending one actual requirements. That is, the content/structure of the apparatus can be divided into different functional modules to complete all or part of the functions described above.

Regarding the apparatus in any of the above embodiment, the specific operation of each module has been described in detail in the corresponding method embodiments, and description thereof will be omitted here.

Figure 27:
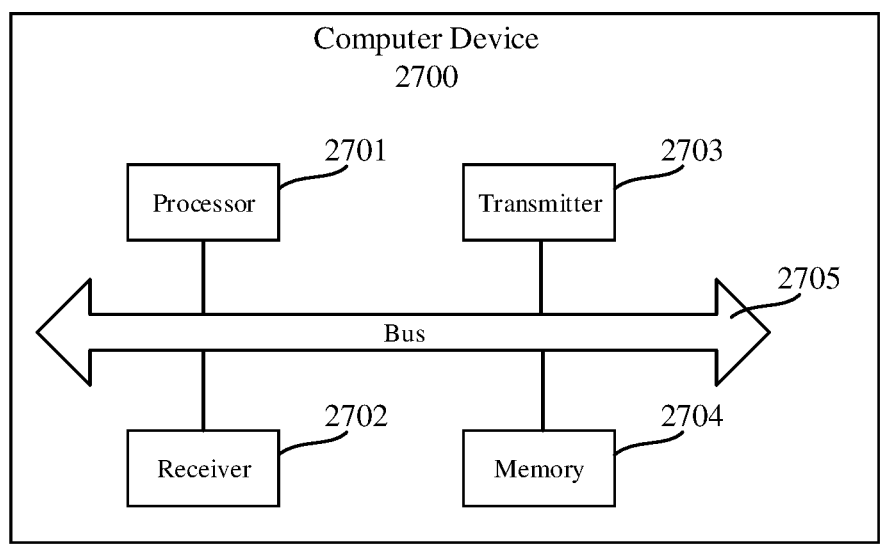
FIG. 27 is a schematic structural diagram of a computer device according to an embodiment of the present disclosure.

Reference is now made to FIG. 27, which is a schematic diagram showing a structure of a computer device 2710 according to an embodiment of the present disclosure. The computer device 2700 may include: a processor 2701, a receiver 2702, a transmitter 2703, a memory 2704, and a bus 2705.

The processor 2701 includes one or more processing cores, and the processor 2701 implements various functional applications and information processing by executing software programs and modules.

The receiver 2702 and the transmitter 2703 may be implemented as a communication component, which may be a communication chip. The communication chip may also be referred to as a transceiver.

The memory 2704 is connected to the processor 2701 through the bus 2705.

The memory 2704 can be configured to store a computer program, and the processor 2701 can be configured to execute the computer program, so as to implement various steps performed by the terminal device in the above method embodiments.

In addition, the memory 2704 can be implemented by any type of volatile or non-volatile storage device or any combination thereof, the volatile or non-volatile storage device including, but not limited to: Magnetic disk or optical disk, Electrically Erasable Programmable Read Only Memory (EEPROM), Erasable Programmable Read Only Memory (EPROM), Static Random Access Memory (SRAM), Read-Only Memory (ROM), magnetic memory, flash memory, Programmable Read-Only Memory (PROM).

The above computer device may be implemented as the multicast optimization device/first AP in each of the above method embodiments. Alternatively, the above computer device may be implemented as the second AP in each of the above method embodiments.

In an exemplary embodiment, the computer device includes a processor, a memory, and a transceiver (the transceiver may include a receiver for receiving information and a transmitter for transmitting information).

When the above computer device is implemented as the multicast optimization device/first AP in each of the above method embodiments:
the transceiver is configured to obtain station information lists of at least two wireless Access Points (APs), the station information list of a target AP including channel quality information of a first-type station associated with the target AP and channel quality information of a second-type station associated with the target AP, the first-type station being a station in an Overlapping Basic Service Set (OBSS) and the second-type station being a station not in the OBSS, the target AP being any one of the at least two APs; and
the processor is configured to generate multicast optimization information for the at least two APs based on the station information lists of the at least two APs respectively, the multicast optimization information for the at least two APs indicating multicast rates of the at least two APs and multicast receiving stations of the at least two APs.

When the above computer device is implemented as the second AP in each of the above method embodiments:
the transceiver is configured to obtain a station information list of the second AP, a station information list of a target AP including channel quality information of a first-type station associated with the target AP and channel quality information of a second-type station associated with the target AP, the first-type station being a station in an Overlapping Basic Service Set (OBSS) and the second-type station being a station not in the OBSS, the target AP being any one of the at least two APs; and the transceiver is further configured to transmit the station information list of the second AP to a multicast optimization device, such that the multicast optimization device generates multicast optimization information for the at least two APs based on the station information lists of the at least two APs respectively, the multicast optimization information for the at least two APs indicating multicast rates of the at least two APs and multicast receiving stations of the at least two APs.

The embodiment of the present disclosure further provides a computer-readable storage medium, having a computer program stored therein. The computer program is loaded and executed by a processor to implement the steps performed by the multicast optimization device/first AP in the above method shown in FIG. 2 or FIG. 5; or the computer program is loaded and executed by a processor to implement the steps performed by the second AP in the above method shown in FIG. 3 or FIG. 5.

The present disclosure further provides a computer program product or computer program. The computer program product or computer program includes computer instructions stored in a computer-readable storage medium. A processor of a computer device reads the computer instructions from the computer-readable storage medium, and executes the computer instruction, such that the computer device performs the steps performed by the multicast optimization device/first AP in the above method shown in FIG. 2 or FIG. 5 or the steps performed by the second AP in the above method shown in FIG. 3 or FIG. 5.

It can be appreciated by those skilled in the art that, in one or more of the above examples, the functions described in the embodiments of the present disclosure may be implemented by hardware, software, firmware, or any combination thereof. When implemented by software, the functions may be stored in a computer-readable medium or transmitted as one or more instructions or codes on a computer-readable medium. The computer-readable medium includes a computer storage medium and a communication medium. The communication medium includes any medium that facilitates transfer of a computer program from one place to another. The storage medium can be any available medium that can be accessed by a general purpose or special purpose computer.

While the preferred embodiments of the present disclosure have been described above, they are not intended to limit the present disclosure. Any modifications, equivalents, or improvements that can be made within the spirit and principle of the present disclosure are to be encompassed by the scope of the present disclosure.

What is claimed is:

1. A multicast transmission control method, comprising:
   obtaining station information lists of at least two wireless Access Points (APs), the station information list of a target AP including channel quality information of a first-type station associated with the target AP and channel quality information of a second-type station associated with the target AP, the first-type station being a station in an Overlapping Basic Service Set (OBSS) and the second-type station being a station not in the OBSS, the target AP being any one of the at least two APs; and
   generating multicast optimization information for the at least two APs based on the station information lists of the at least two APs respectively, the multicast optimization information for the at least two APs indicating multicast rates of the at least two APs and multicast receiving stations of the at least two APs.

2. The method according to claim 1, wherein the station information list of the target AP comprises:
   an identifier of the first-type station associated with the target AP;
   channel quality information from the target AP to the associated first-type station;
   channel quality information from a near-station AP of the first-type station associated with the target AP to the first-type station associated with the target AP, the near-station AP being one of the at least two APs, other than the associated AP, that has highest channel quality with the corresponding station;
   an identifier of the near-station AP of the first-type station associated with the target AP;
   an identifier of the second-type station associated with the target AP; and
   channel quality information from the target AP to the associated second-type station.

3. The method according to claim 2, wherein said generating the multicast optimization information for the at least two APs based on the station information lists of the at least two APs respectively comprises:
   obtaining initial optimization parameters for the at least two APs based on the station information lists of the at least two APs, the optimization parameters comprising target channel quality information and a target station corresponding to the target channel quality information, the initial target channel quality information being channel quality information having lowest channel quality in the station information list of the corresponding AP;
   performing multicast optimization on the at least two APs in an ascending order of the channel quality of the initial target channel quality information, to obtain the respective multicast rates of the at least two APs and the respective multicast receiving stations of the at least two APs; and
   generating the multicast optimization information for the at least two APs based on the respective multicast rates of the at least two APs and the respective multicast receiving stations of the at least two APs.

4. The method according to claim 3, wherein said performing multicast optimization on the at least two APs in the ascending order of the channel quality of the initial target channel quality information comprises:
   obtaining, for a first AP of the at least two APs, a multicast rate of the first AP based on the initial target channel quality information of the first AP.

5. The method according to claim 3, wherein said performing multicast optimization on the at least two APs in the ascending order of the channel quality of the initial target channel quality information comprises:
   setting, for an i-th AP of the at least two APs when the target station of the i-th AP is the first-type station and an optimization condition is met, the target station of the i-th AP as the multicast receiving station of the near-station AP of the target station of the i-th AP, the optimization condition comprising: the channel quality of the target channel quality information of the i-th AP being higher than channel quality of channel quality information from the near-station AP to the target station of the i-th AP, and the channel quality of the channel quality information from the station-adjacent AP to the target station of the i-th AP being higher than channel quality of the target channel quality information of the near-station AP; and updating, when there are non-selected stations in the station information list of the i-th AP, one of the non-selected stations that has lowest channel quality corresponding to channel quality information as the target station of the i-th AP, the non-selected stations being stations not selected as the target station of the i-th AP.

6. The method according to claim 5, wherein said performing multicast optimization on the at least two APs in the ascending order of the channel quality of the initial target channel quality information further comprises:

obtaining, when the target station of the i-th AP is the second-type station, or when the target station of the i-th AP is the first-type station and the optimization condition is not met, the multicast rate of the i-th AP based on the target channel quality information of the i-th AP.

7. The method according to claim 1, wherein when the method is performed by a first AP of the at least two APs, said obtaining the station information lists of the at least two wireless APs comprises:

receiving a channel quality report transmitted by each STA associated with the first AP, the channel quality report indicating channel quality from each AP around the corresponding STA to the corresponding STA; and generating the station information list of the first AP based on channel quality reports transmitted by respective STAs associated with the first AP.

8. The method according to claim 1, wherein when the method is performed by a first AP of the at least two APs, the method further comprises:

setting the multicast rate of the first AP according to the multicast optimization information for the first AP.

9. The method according to claim 1, wherein when the method is performed by a first AP of the at least two APs, the method further comprises, prior to obtaining the station information lists of the at least two wireless APs:

obtaining a number of neighbor APs of the first AP, the number of neighbor APs being a number of neighbor APs of the corresponding AP;

transmitting the number of neighbor APs of the first AP via a beacon frame;

receiving a beacon frame transmitted by each neighboring AP;

obtaining a number of neighbor APs of each neighboring AP from the beacon frame transmitted by the neighboring AP, and determining, when the number of neighbor APs of each neighboring AP is smaller than the number of neighbor APs of the first AP, the first AP as a master AP among the at least two APs.

10. A computer device, comprising a processor, a memory, and a transceiver, wherein the transceiver is configured to obtain station information lists of at least two wireless Access Points (APs), the station information list of a target AP including channel quality information of a first-type station associated with the target AP and channel quality information of a second-type station associated with the target AP, the first-type station being a station in an Overlapping Basic Service Set (OBSS) and the second-type station being a station not in the OBSS, the target AP being any one of the at least two APs; and the processor is configured to generate multicast optimization information for the at least two APs based on the station information lists of the at least two APs respectively, the multicast optimization information for the at least two APs indicating multicast rates of the at least two APs and multicast receiving stations of the at least two APs.

11. The computer device according to claim 10, wherein the station information list of the target AP comprises:

an identifier of the first-type station associated with the target AP;

channel quality information from the target AP to the associated first-type station;

channel quality information from a near-station AP of the first-type station associated with the target AP to the first-type station associated with the target AP, the near-station AP being one of the at least two APs, other than the associated AP, that has highest channel quality with the corresponding station;

an identifier of the near-station AP of the first-type station associated with the target AP;

an identifier of the second-type station associated with the target AP; and channel quality information from the target AP to the associated second-type station.

12. The computer device according to claim 11, wherein said generating the multicast optimization information for the at least two APs based on the station information lists of the at least two APs respectively comprises:

obtaining initial optimization parameters for the at least two APs based on the station information lists of the at least two APs, the optimization parameters comprising target channel quality information and a target station corresponding to the target channel quality information, the initial target channel quality information being channel quality information having lowest channel quality in the station information list of the corresponding AP;

performing multicast optimization on the at least two APs in an ascending order of the channel quality of the initial target channel quality information, to obtain the respective multicast rates of the at least two APs and the respective multicast receiving stations of the at least two APs; and generating the multicast optimization information for the at least two APs based on the respective multicast rates of the at least two APs and the respective multicast receiving stations of the at least two APs.

13. The computer device according to claim 10, wherein when the computer device is applied in a first AP of the at least two APs, the processor is further configured to:

set the multicast rate of the first AP according to the multicast optimization information for the first AP.

14. The computer device according to claim 10, wherein when the computer device is applied a first AP of the at least two APs, the transceiver is configured to, prior to obtaining the station information lists of the at least two wireless APs:

obtain a number of neighbor APs of the first AP, the number of neighbor APs being a number of neighbor APs of the corresponding AP;

transmit the number of neighbor APs of the first AP via a beacon frame;

receive a beacon frame transmitted by each neighboring AP; and obtain a number of neighbor APs of each neighboring AP from the beacon frame transmitted by the neighboring AP, and the processor is further configured to determine, when the number of neighbor APs of each neighboring AP is smaller than the number of neighbor APs of the first AP, the first AP as a master AP among the at least two APs.

15. A computer device, implemented as a second wireless Access Point (AP) of at least two APs, the computer device comprising a processor, a memory, and a transceiver, wherein the transceiver is configured to obtain a station information list of the second AP, a station information list of a target AP including channel quality information of a first-type station associated with the target AP and channel quality information of a second-type station associated with the target AP, the first-type station being a station in an Overlapping Basic Service Set (OBSS) and the second-type station being a station not in the OBSS, the target AP being any one of the at least two APs; and the transceiver is further configured to transmit the station information list of the second AP to a multicast optimization device, such that the multicast optimization device generates multicast optimization information for the at least two APs based on the station information lists of the at least two APs respectively, the multicast optimization information for the at least two APs indicating multicast rates of the at least two APs and multicast receiving stations of the at least two APs.

16. The computer device according to claim 15, wherein said obtaining the station information list of the second AP comprises:

receiving a channel quality report transmitted by each STA associated with the second AP, the channel quality report indicating channel quality from each AP around the corresponding STA to the corresponding STA; and generating the station information list of the second AP based on channel quality reports transmitted by respective STAs associated with the second AP.

17. The computer device according to claim 16, wherein the transceiver is further configured to, prior to receiving the channel quality report transmitted by each STA associated with the first AP:

transmit a channel measurement indication to each STA associated with the first AP, the channel measurement indication indicating measurement parameters comprising a measured channel and measurement time.

18. The computer device of claim 15, wherein:

the transceiver is further configured to receive the multicast optimization information for the second AP transmitted by the multicast optimization device; and the processor is configured to set the multicast rate of the second AP according to the multicast optimization information for the second AP.

19. The computer device of claim 18, wherein the transceiver is further configured to:

transmit, when the multicast optimization information for the second AP indicates that there is an optimized station among stations associated with the second AP, a receiving instruction to the optimized station, the receiving instruction instructing the optimized station to receive multicast data from a corresponding near-station AP, wherein the optimized station is set as a multicast receiving station of the corresponding near-station AP.

20. The computer device according to claim 15, wherein the transceiver is further configured to, prior to obtaining the station information list of the second AP:

obtain a number of neighbor APs of the second AP, the number of neighbor APs being a number of neighboring APs of the corresponding AP;

transmit the number of neighbor APs of the second AP via a beacon frame;

receive a beacon frame transmitted by each neighboring AP; and obtain a number of neighbor APs of each neighboring AP from the beacon frame transmitted by the neighboring AP, wherein the processor is configured to determine, when the number of neighbor APs of any neighboring AP is greater than the number of neighbor APs of the second AP, the second AP as a slave AP among the at least two APs.

* * * * *